United States Patent [19]
Ikebe et al.

[11] Patent Number: 6,094,326
[45] Date of Patent: Jul. 25, 2000

[54] DISC CARTRIDGE WITH IMPROVED SHUTTER MECHANISM

[75] Inventors: Masaru Ikebe; Masatoshi Okamura, both of Nagano, Japan

[73] Assignee: TDK Corporation, Japan

[21] Appl. No.: 08/909,897

[22] Filed: Aug. 12, 1997

[30] Foreign Application Priority Data

| Aug. 20, 1996 | [JP] | Japan | 8-235770 |
| Aug. 27, 1996 | [JP] | Japan | 8-242563 |
| Aug. 30, 1996 | [JP] | Japan | 8-246934 |
| Nov. 14, 1996 | [JP] | Japan | 8-316893 |
| Nov. 18, 1996 | [JP] | Japan | 8-322294 |
| Nov. 18, 1996 | [JP] | Japan | 8-322298 |
| Nov. 18, 1996 | [JP] | Japan | 8-322300 |
| Nov. 18, 1996 | [JP] | Japan | 8-322301 |
| Jun. 25, 1997 | [JP] | Japan | 9-183219 |

[51] Int. Cl.[7] ............................ G11B 23/03; G11B 7/26
[52] U.S. Cl. ................................ 360/133; 369/291
[58] Field of Search ............................ 360/133; 369/291

[56] References Cited

U.S. PATENT DOCUMENTS 5,048,008  9/1991  Haruna .................................. 369/291

FOREIGN PATENT DOCUMENTS

| 60-43279 | 3/1985 | Japan . |
| 61-41189 | 11/1986 | Japan . |
| 1-248378 | 10/1989 | Japan . |
| 7-153221 | 6/1995 | Japan . |
| 7-226046 | 8/1995 | Japan . |

*Primary Examiner*—David Davis
*Attorney, Agent, or Firm*—Lerner, David, Littenberg, Krumholz & Mentlik, LLP

[57] ABSTRACT

A disc cartridge capable of ensuring smooth operation of a shutter while decreasing a size of the shutter, permitting the shutter to be made of inexpensive rein and being applied to both a double-direction sliding shutter structure and a single-direction sliding shutter structure. The shutter includes an upper plate, a lower plate and a connection for connecting the upper and lower plates to each other therethrough. The disc cartridge further includes a slider for slidably guiding the shutter and a spring for urging the shutter in a closing direction. The connection of the shutter is provided with a lug against which a shutter operation member of a recording/reproducing apparatus is abutted. The slider is arranged in the lug while being kept in contact with an inner surface of the lug.

30 Claims, 23 Drawing Sheets

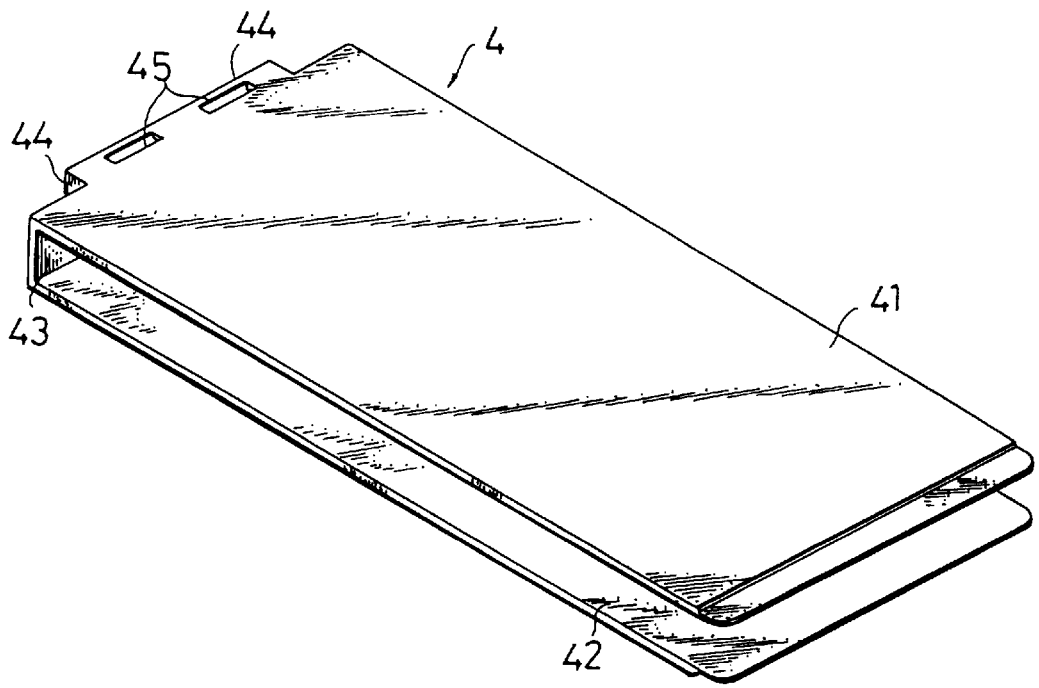
FIG. 2A
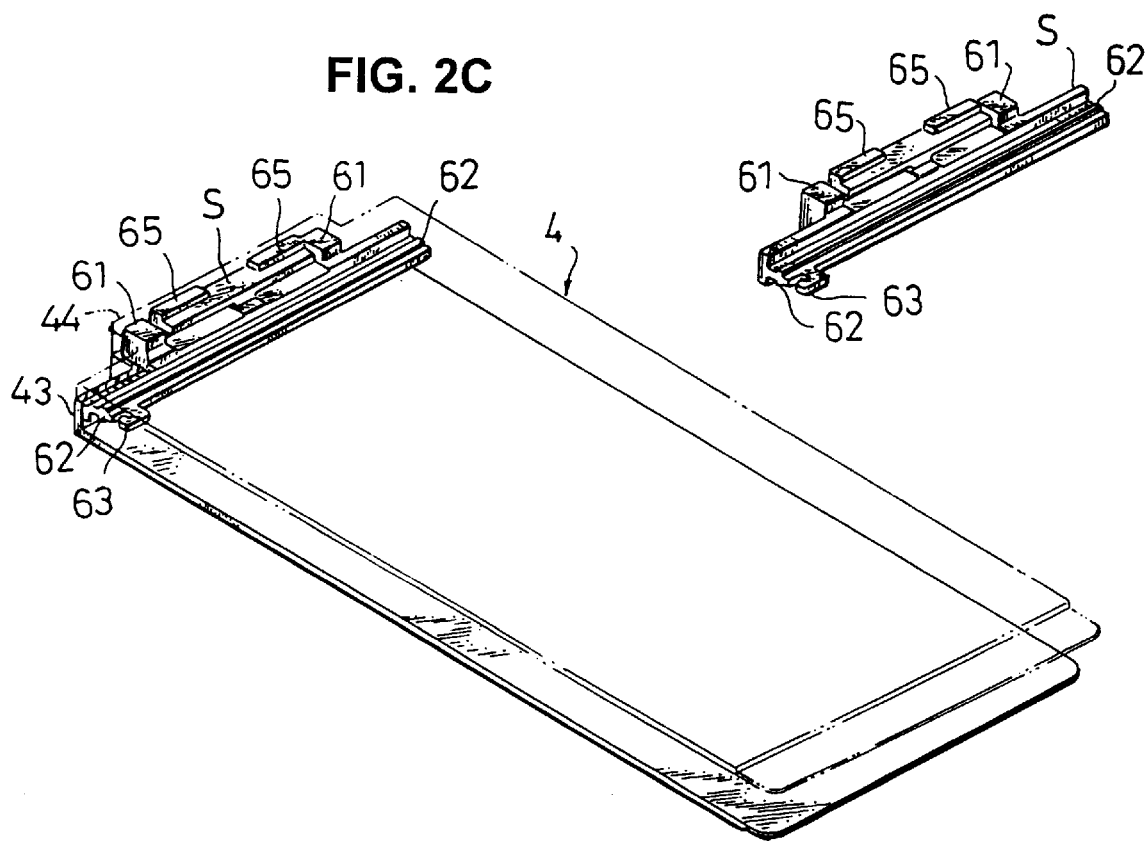
FIG. 2B
FIG. 2C

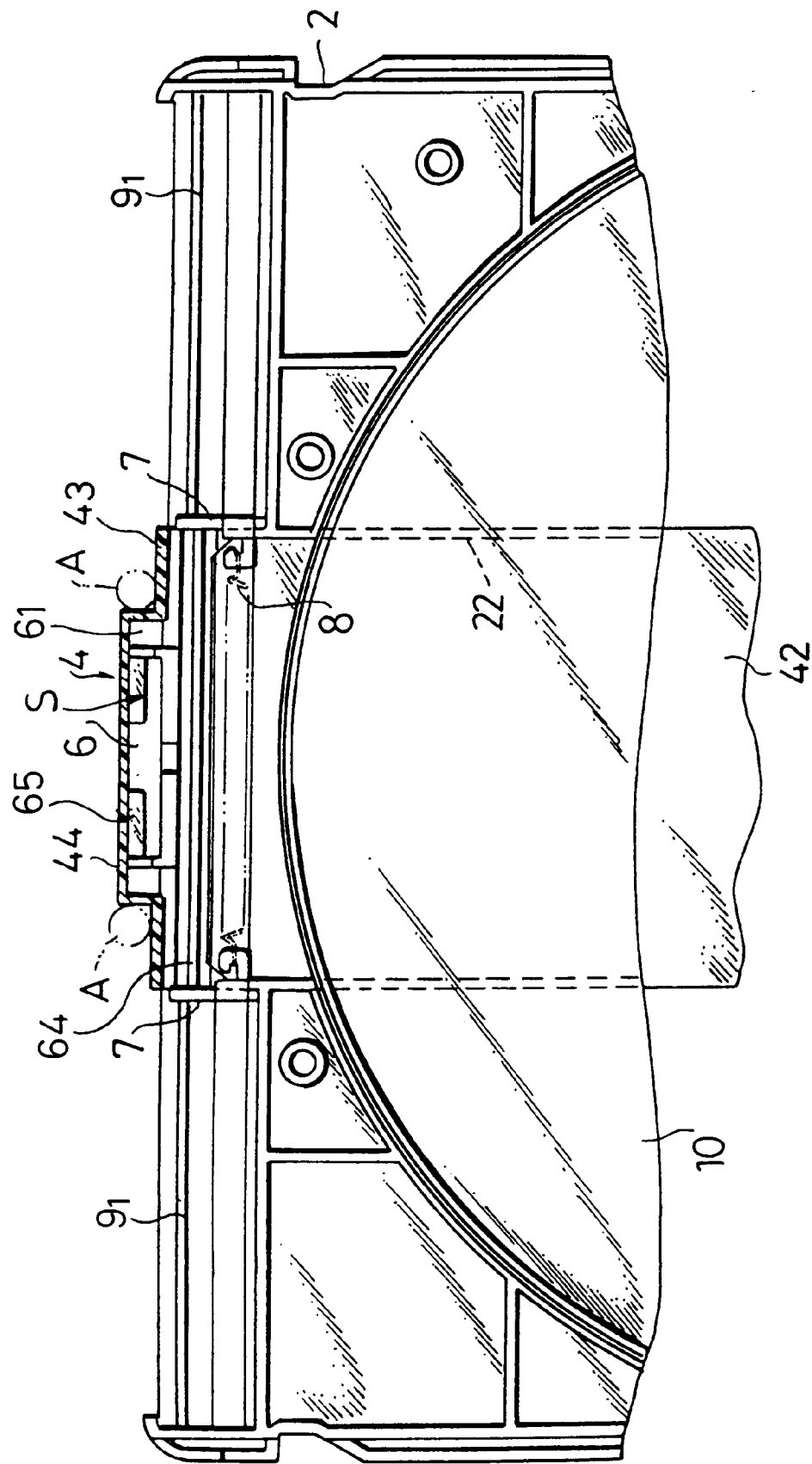

FIG. 17
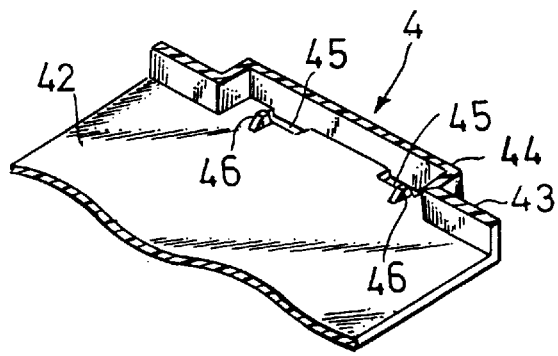
FIG. 18A
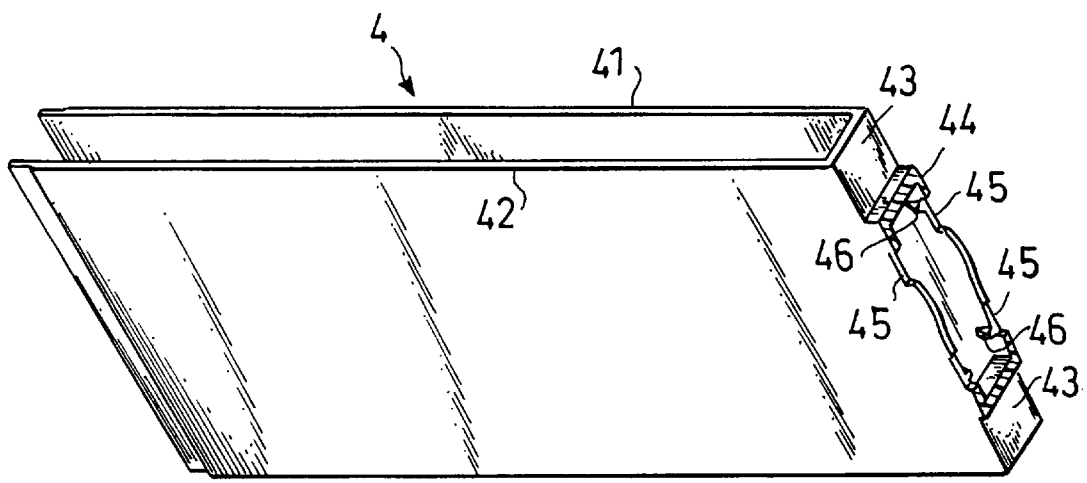
FIG. 18B  FIG. 18C
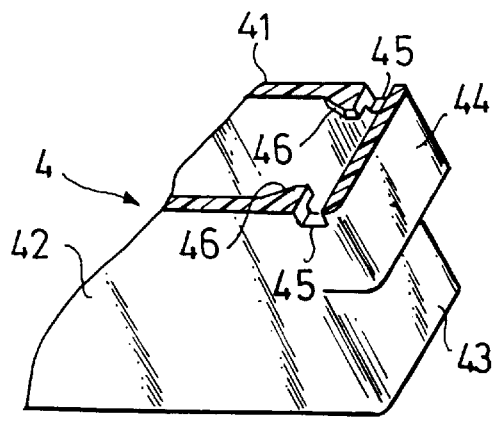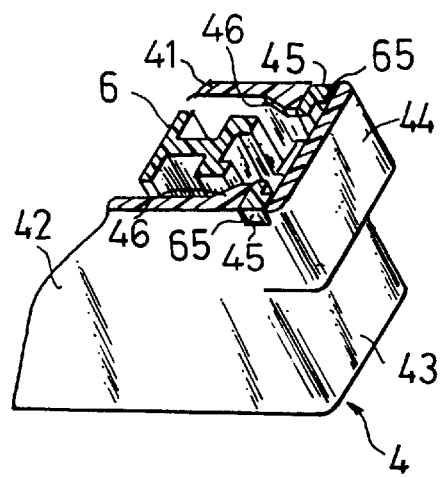

DISC CARTRIDGE WITH IMPROVED SHUTTER MECHANISM

BACKGROUND OF THE INVENTION

This invention relates to a disc cartridge, and more particularly to a disc cartridge having a disc-like medium such as a recordable/reproducible optical disc, a magneto-optical disc or the like rotatably received in a casing.

In general, an information medium including, for example, a disc medium such as a magnetic disc, an optical disc, a magneto-optical disc or the like is used in the form of a disc cartridge while being received in a casing formed by joining upper and lower casing members to each other. The disc cartridge includes a shutter for opening and closing openings such as head insertion holes, drive shaft insertion holes and the like formed at of the upper and lower casing members of the casing. For such a conventional disc cartridge, a shutter operation system is proposed as disclosed in Japanese Patent Application Laid-Open Publication No. 226046/1995, wherein a shutter which is made of metal is fixed on a slider by means of screws, so that sliding movement of the slider on a casing permits the shutter to be slidably guided on the casing. Also, a number of systems for opening a shutter in both lateral directions of a casing are proposed for a disc cartridge which has a both-sided recordable/reproducible disc-like medium received in the casing. For example, Japanese Patent Application Laid-Open Publication No. 153221/1995 or No. 43279/1985 discloses a shutter operation system wherein a slidetype shutter is provided on both sides thereof with return springs such as coiled torsion springs for urging the shutter in a closing direction to close head insertion holes and the like in a manner to be independent from each other.

The former shutter operation system described above fails to small-size the disc cartridge because it causes a distance between an end of the slider and the shutter opposite thereto to be disadvantageously increased. Also, a structure of the slider employed in the system fails to apply the slider to a disc cartridge of the double-direction sliding type that the shutter is open in both lateral directions. Further, fixing of the shutter on the slider by means of the screws in the former system causes both the number of parts for the disc cartridge and the number of steps for assembling of the disc cartridge to be increased. Also, it leads to a variation in direction of the assembling, resulting in the assembling being substantially troublesome.

The latter shutter operation system of the double-direction sliding type wherein the shutter is opened in both lateral directions of the casing causes a portion of the shutter engaged with a shutter operation member of a recording/reproducing apparatus to be formed with a groove-like configuration. Such configuration of the shutter gives rise to application of load to the shutter, leading to damage to the shutter such as deformation thereof, breakage thereof or the like, because operation of the shutter is carried out by abutment of the shutter operation member against the shutter relatively reduced in thickness. Also, the latter system is complicated in manufacturing to a degree sufficient to cause an increase in cost of the disc cartridge. Further, it causes a deterioration in easiness of assembling of the shutter. More particularly, assembling of the shutter and return springs with respect to the upper and lower casing members of the casing is highly troublesome and difficult, to thereby deteriorate mass-production of the disc cartridge. For example, when incorporation of the return springs in any one of the upper and lower casing members is carried out prior to joining between the upper casing member and the lower casing, holding of the springs on the slider is failed to cause the springs to be disengaged from the casing member due to an elastic force of the springs, resulting in automation of the assembling and energy savings in the assembling being substantially failed. Incorporation of the return springs after the joining eliminates such a disadvantage as described above. However, it requires to form a side surface of a front portion of the casing with a large opening for inserting the springs therethrough into the casing. Unfortunately, this causes dust or the like to enter the casing through the opening. Also, it causes the slider and the like to be exposed through the opening, leading to damage thereto, so that the disc cartridge is deteriorated in durability. In addition, it fails in small-sizing of the disc cartridge and fails to permit the disc cartridge to exhibit easiness in assembling and reliability in operation.

Furthermore, in the case that the head insertion holes are each formed with a width reduced as compared with a width of the casing defined in a direction of movement of the shutter, a space is formed between an end of the shutter in an opening direction to open the head insertion holes and an end of the casing when the shutter is open, so that the coiled torsion springs do not cause any problem. However, in the case that the end of the shutter approaches the end of the casing when the shutter is open, deformation of the coiled torsion springs is increased to a degree sufficient to deteriorate durability of the springs. Also, this causes a space in which a coil portion of each of the coiled torsion springs is moved to be lost. Thus, it is required to reduce a size of the coil portion. However, this leads to a deterioration in durability of the spring.

Moreover, the double-direction sliding shutter structure has a further disadvantage that it is required to pay attention to production of shavings due to operation of the slider and an error of dimensions of the slider. Otherwise, satisfactory operation of the shutter is failed.

It is generally known in the art that the conventional disc cartridge is provided with an erasure prevention member in a manner to be movable, so that a user may select any one of "recordable" and "unrecordable" states when the record medium is received in the casing. Also, it is known that detection of "recordable" or "unrecordable" is carried out depending on light transmission through the casing or mechanical on-off operation of a switch. When the record medium or disc received in the casing of the disc cartridge is of the double-sided recordable/reproducible type, it is required to arrange the erasure prevention member for each of both sides. For example, Japanese Utility Model Publication No. 41189/1986 proposes a disc cartridge which is so constructed that a casing is provided on a side surface thereof with holes through which two erasure prevention members each provided on each of upper and lower surfaces thereof with a projection are operated, respectively.

However, the above-described arrangement of two such erasure prevention members requires any identification means because the disc cartridge fails to clarify correspondence between the two erasure prevention members and both upper and lower surfaces of the disc. Also, the above-described configuration of the erasure prevention members causes interference between the members and the casing during assembling of the disc cartridge, to thereby render the assembling highly troublesome, because the assembling is generally carried out by incorporating parts of the disc cartridge in one of the upper and lower casing members of the casing and then joining the other casing member to the one casing member.

SUMMARY OF THE INVENTION

The present invention has been made in view of the foregoing disadvantages of the prior art.

Accordingly, it is an object of the present invention to provide a disc cartridge which is capable of permitting a shutter to be reduced in size and made of inexpensive resin material.

It is another object of the present invention to provide a disc cartridge which is capable of being satisfactorily applied to both a single-direction sliding shutter structure and a double-direction sliding shutter structure.

It is still another object of the present invention to provide a disc cartridge which is capable of ensuring satisfactory operation of a shutter and highly facilitating assembling thereof.

It is even another object of the present invention to provide a disc cartridge which is capable of facilitating assembling thereof while having two erasure prevention members of the same configuration incorporated therein even when it has a double-sided disc received therein.

It is yet another object of the present invention to provide a disc cartridge which is capable of permitting a user to intuitionally identify correspondence between both sides or surfaces of a double-sided disc and two erasure members.

It is a further object of the present invention to provide a disc cartridge which is capable of facilitating assembling thereof and exhibiting increased reliability even when a shutter is constructed into a double-direction sliding structure.

It is a still further object of the present invention to provide a disc cartridge which is capable of ensuring satisfactory and reliable operation of a shutter even when a shutter is constructed into a double-direction sliding structure.

In accordance with the present invention, a disc cartridge is provided. The disc cartridge includes a casing formed with openings through which a recording/reproducing head and a drive shaft are inserted into the casing, a disc-like medium rotatably received in the casing, and a shutter for opening and closing the openings. The shutter is formed with a substantially U-shape in section and includes an upper plate, a lower plate and a connection for connecting the upper plate and lower plate to each other therethrough. The disc cartridge also includes a slider for sliding the shutter on the casing and an elastic member or spring for urging the shutter in a closing direction to close the openings. The connection of the shutter is provided with a lug with which a shutter operation member of a recording/reproducing apparatus is abuttedly engaged. The slider is arranged in a manner to be fitted in the lug of the connection of the shutter while being abutted against an inner surface of the lug.

In a preferred embodiment of the present invention, the lug is formed with a mounting hole. The slider is provided on opposite ends thereof with respective reinforcements for reinforcing the lug and formed thereon with a projection which is fitted in the mounting hole of the lug.

In a preferred embodiment of the present invention, the disc cartridge further includes two erasure prevention members which are formed with the same configuration and movably arranged in correspondence to upper and lower surfaces of the casing, respectively. The casing includes an upper casing member and a lower casing member. One of the upper and lower casing members is provided on an inner surface thereof with partition walls in a manner to vertically extend therefrom, to thereby provide the one casing member with receiving sections for receiving the erasure prevention members while orientating them vertically inversely to each other. The one casing member which is provided thereon with the partition walls is provided thereon with stopper means for setting a range of movement of each of the erasure prevention members.

In a preferred embodiment of the present invention, the slider includes a first slider member which slides while being engaged with a first guide section provided on the casing and a pair of second slider members which slide while being engaged with a second guide section provided on the casing and are arranged on opposite ends of the first slider member so as to interpose the first slider member therebetween while being pressed against the first slider member by means of the spring. The casing is provided with stopper projections which are positioned at opposite ends of the openings formed at a central portion of a front end of the casing. The second slider members are arranged in a manner to be disengageably pressedly abutted against the stopper projections, respectively.

In a preferred embodiment of the present invention, the slider includes a first slider member which slides while being engaged with a first guide section provided on the casing and a pair of second slider members which slide while being engaged with a second guide section provided on the casing and are arranged on opposite ends of the first slider member so as to interpose the first slider member therebetween while being pressed against the first slider member by means of the spring. The second slider members are each provided thereon with a spring holder and provided thereon with covering walls in a manner to be positioned on both sides of the spring holder. The first slider member is fitted at each of the opposite ends thereof in the covering walls of a corresponding one of the spring holders.

In a preferred embodiment of the present invention, the slider includes a first slider member which slides while being engaged with a first guide section provided on the casing and a pair of second slider members which slide while being engaged with a second guide section provided on the casing and are arranged on opposite ends of the first slider member so as to interpose the first slider member therebetween while being pressed against the first slider member by means of the spring. The lug is provided in at least one of upper and lower surfaces thereof with mounting holes. The first slider member is provided thereon with elastically deformable projections adapted to be respectively fitted in the mounting holes of the lug.

In a preferred embodiment of the present invention, the slider includes a first slider member which slides while being engaged with a first guide section provided on the casing and a pair of second slider members which slide while being engaged with a second guide section provided on the casing and are arranged on opposite ends of the first slider member so as to interpose the first slider member therebetween while being pressed against the first slider member by means of the spring. At least one of each second slider member and a portion of the casing which is opposite to a corresponding one of the second slider members and through which the second slider members are incorporated into the casing is formed with an inclined guide surface which is inclined with respect to a vertical plane, so that the first and second slider members are assembled in the casing while being spaced from each other through the inclined guide surface.

In a preferred embodiment of the present invention, the slider includes a first slider member which slides while being engaged with a first guide section provided on the casing and a pair of second slider members which slide while being engaged with a second guide section provided on the casing and are arranged on opposite ends of the first slider member so as to interpose the first slider member therebetween while being pressed against the first slider member by means of the spring. The first slider member is formed with recesses and the casing is formed on an inner surface thereof with recesses. The second slider members are each provided thereon with a guide projection fitted in a corresponding one of the recesses of the first slider member and a plate-like guide fitted in a corresponding one of the recesses of said casing.

In a preferred embodiment of the present invention, the slider includes a first slider member which slides while being engaged with a first guide section provided on the casing and a pair of second slider members which slide while being engaged with a second guide section provided on the casing and are arranged on opposite ends of the first slider member so as to interpose the first slider member therebetween while being pressed against the first slider member by means of the spring. The casing is provided on a front end thereof positioned forwardly of the openings thereof with a connection section. The connection of the casing is provided at a central portion thereof with a gap, in which the spring is arranged. The first slider member is formed with guide recesses fitted on the connection section of the casing, to thereby be slidably guided on the connection section.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters or numerals designate like or corresponding parts throughout; wherein:

FIG. 2A is a perspective view showing a shutter incorporated in the disc cartridge of FIG. 1;

FIG. 2B is a perspective view showing a slider for slidably guiding the shutter of FIG. 2A;

FIG. 2C is a partially cut-away perspective view showing incorporation of the slider of FIG. 2B in the shutter of FIG. 2A;

FIG. 7 is a fragmentary enlarged plan view partly in section of the disc cartridge shown in FIG. 6, wherein a shutter is kept at a closing position and an upper casing member and an upper plate of the shutter are omitted for the sake of brevity;

FIG. 17 is a fragmentary perspective view showing a part of an interior of a shutter incorporated in a modification of the disc cartridge shown in FIG. 11;

FIG. 18A is a partially cut-away perspective view of the shutter shown in FIG. 17, which is provided on an inner surface of a lug structure thereof with projections;

FIG. 18B is a fragmentary partially cut-away perspective view of the shutter shown in FIG. 17 before a first slider member is incorporated in the shutter;

FIG. 18C is a fragmentary partially cut-away perspective view of the shutter shown in FIG. 17 which has the first slider member incorporated therein;

DETAILED DESCRIPTION OF THE PREFERRED EMBODIMENTS

Now, a disc cartridge according to the present invention will be described hereinafter with reference to the accompanying drawings.

Figure 1:
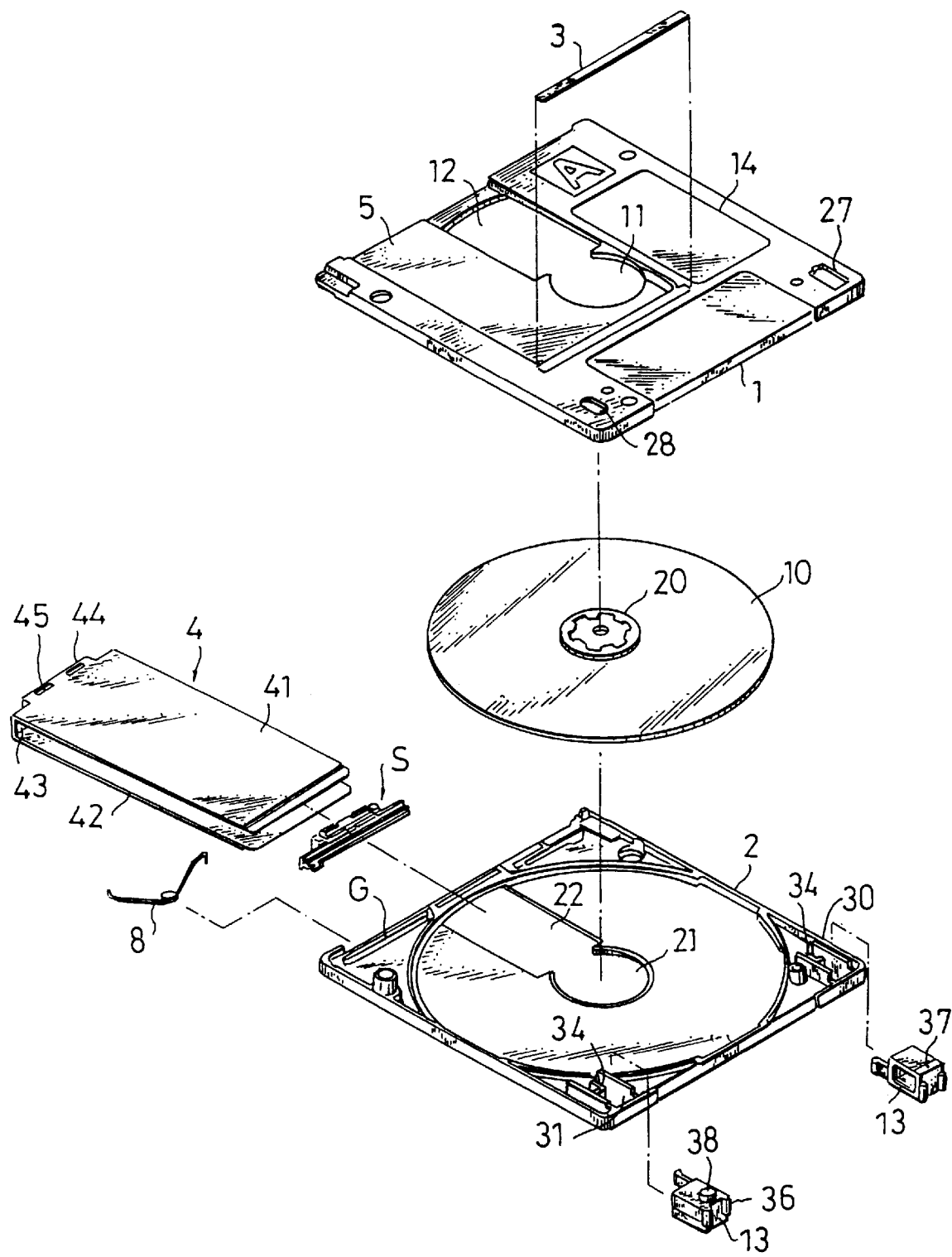
FIG. 1 is an exploded perspective view showing a first embodiment of a disc cartridge according to the present invention.
Figure 3:
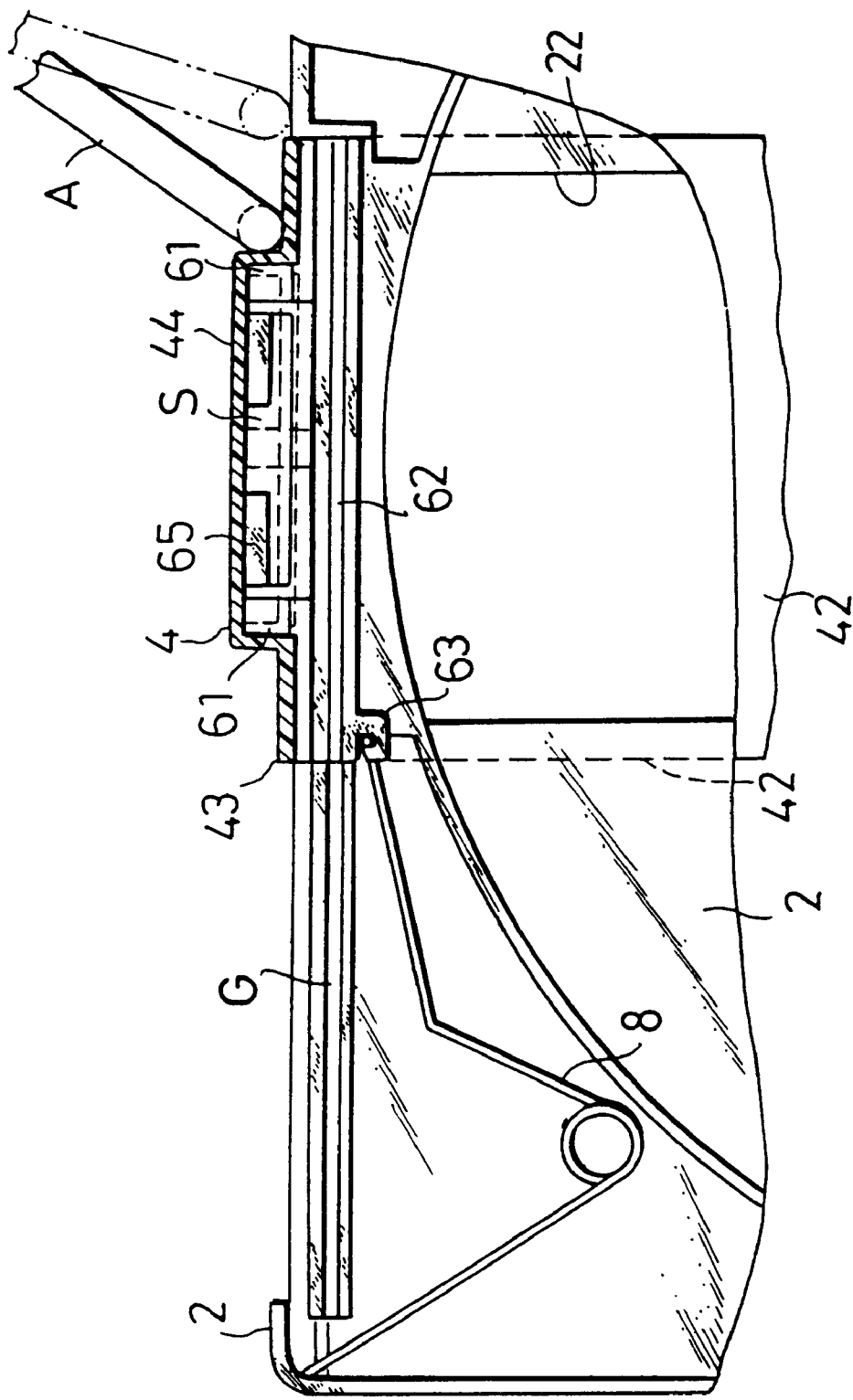
FIG. 3 is a fragmentary enlarged plan view partly in section showing operation of the shutter in the disc cartridge shown in FIG. 1.
Figure 4A:
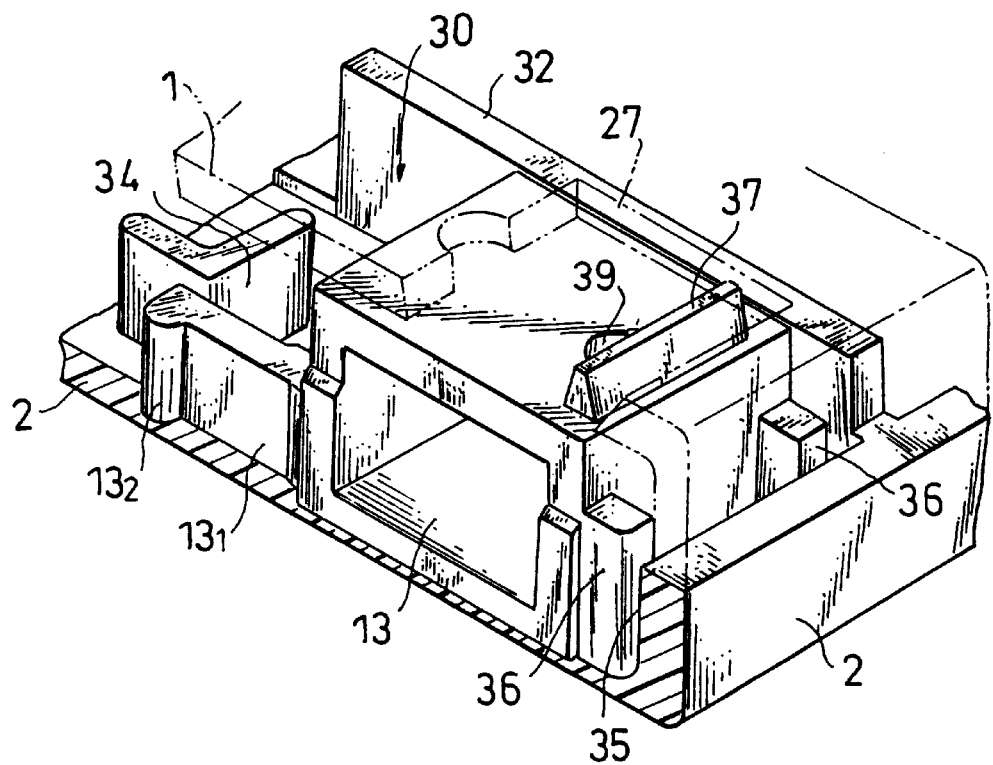
FIG. 4A is an enlarged perspective view showing an erasure prevention member incorporated in the disc cartridge of FIG. 1 in correspondence to a rear side or surface of a disc.
Figure 4B:
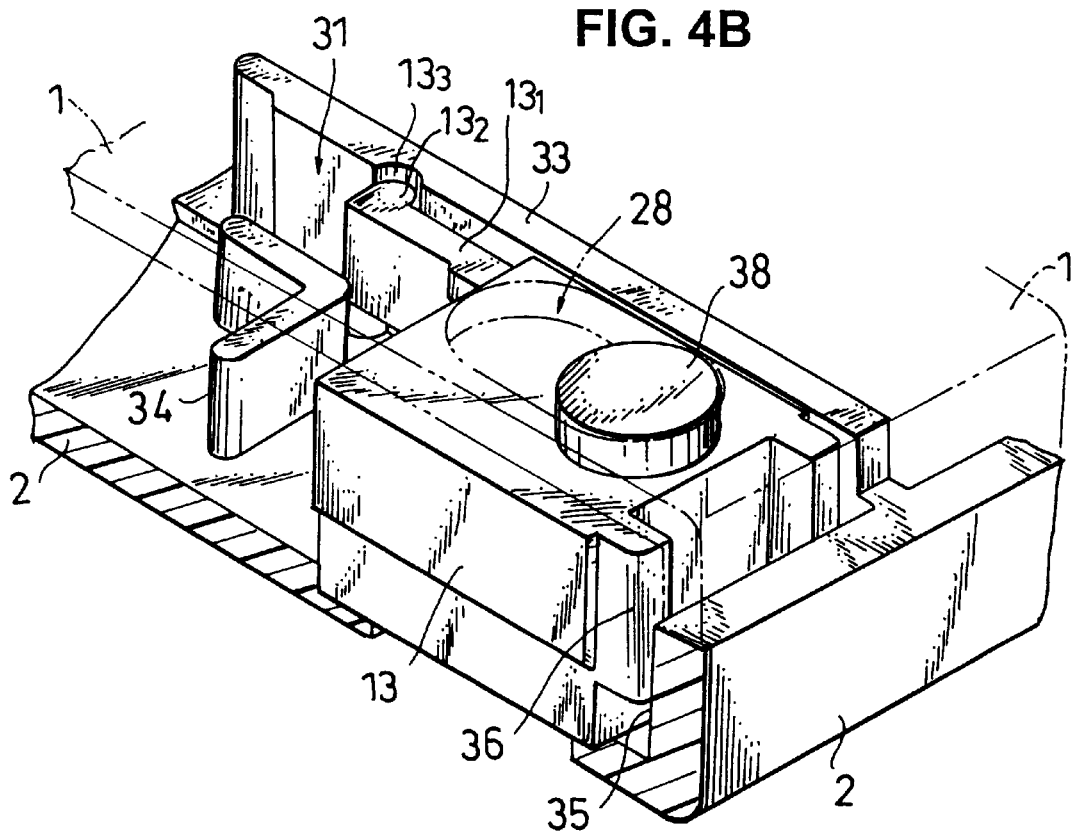
FIG. 4B is an enlarged perspective view showing an erasure prevention member incorporated in the disc cartridge of FIG. 1 in correspondence to a front surface of the disc.
Figure 5A:
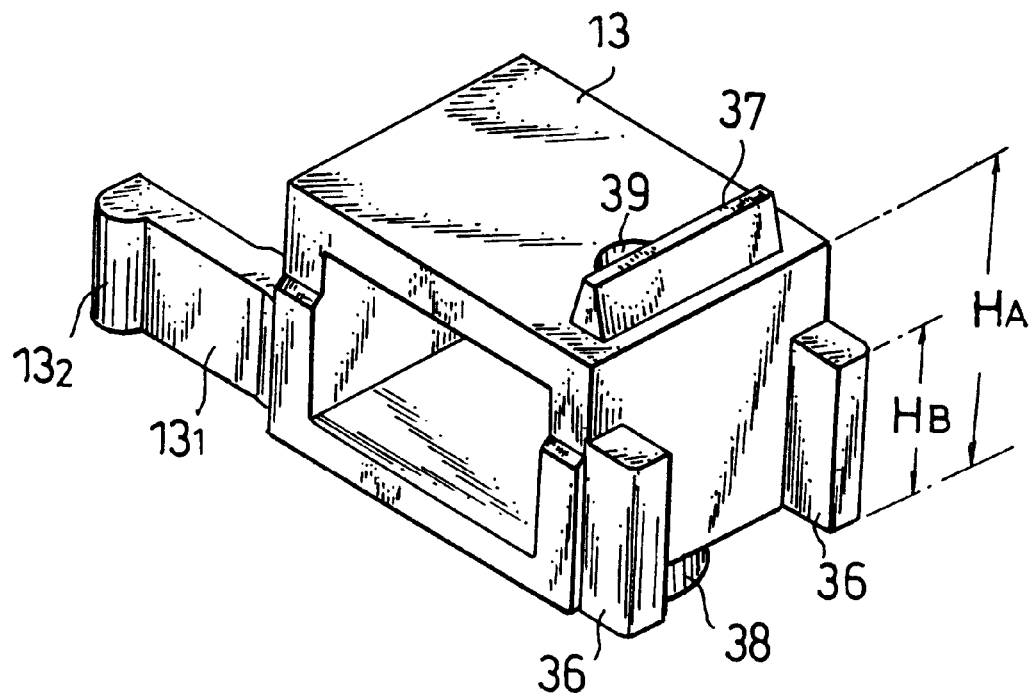
FIG. 5A is an enlarged perspective view showing the erasure prevention member of FIGS. 4A and 4B which is placed an operation section side up.
Figure 5B:
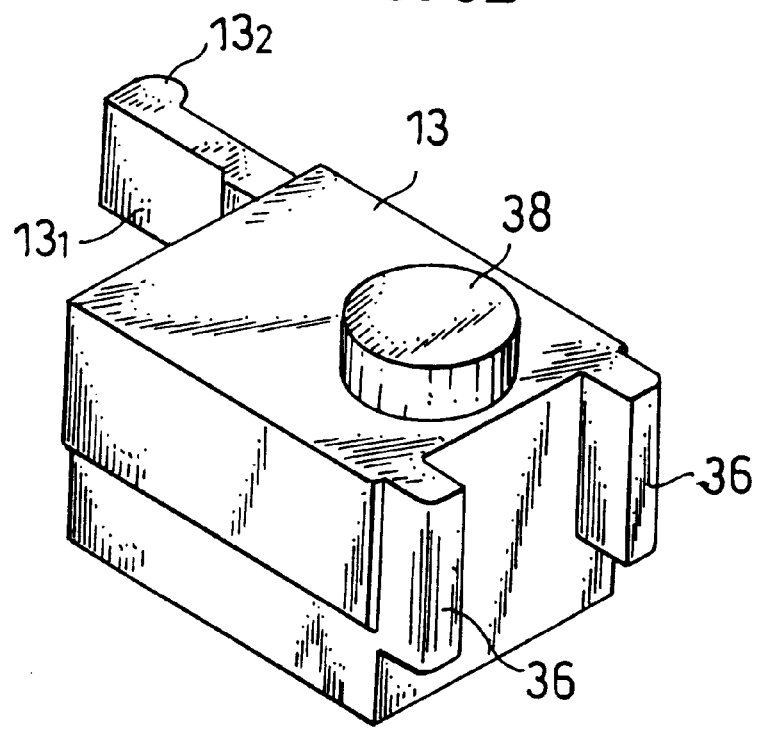
FIG. 5B is an enlarged perspective view showing the erasure prevention member of FIGS. 4A and 4B which is placed an identification detecting section side up.
Figure 6:
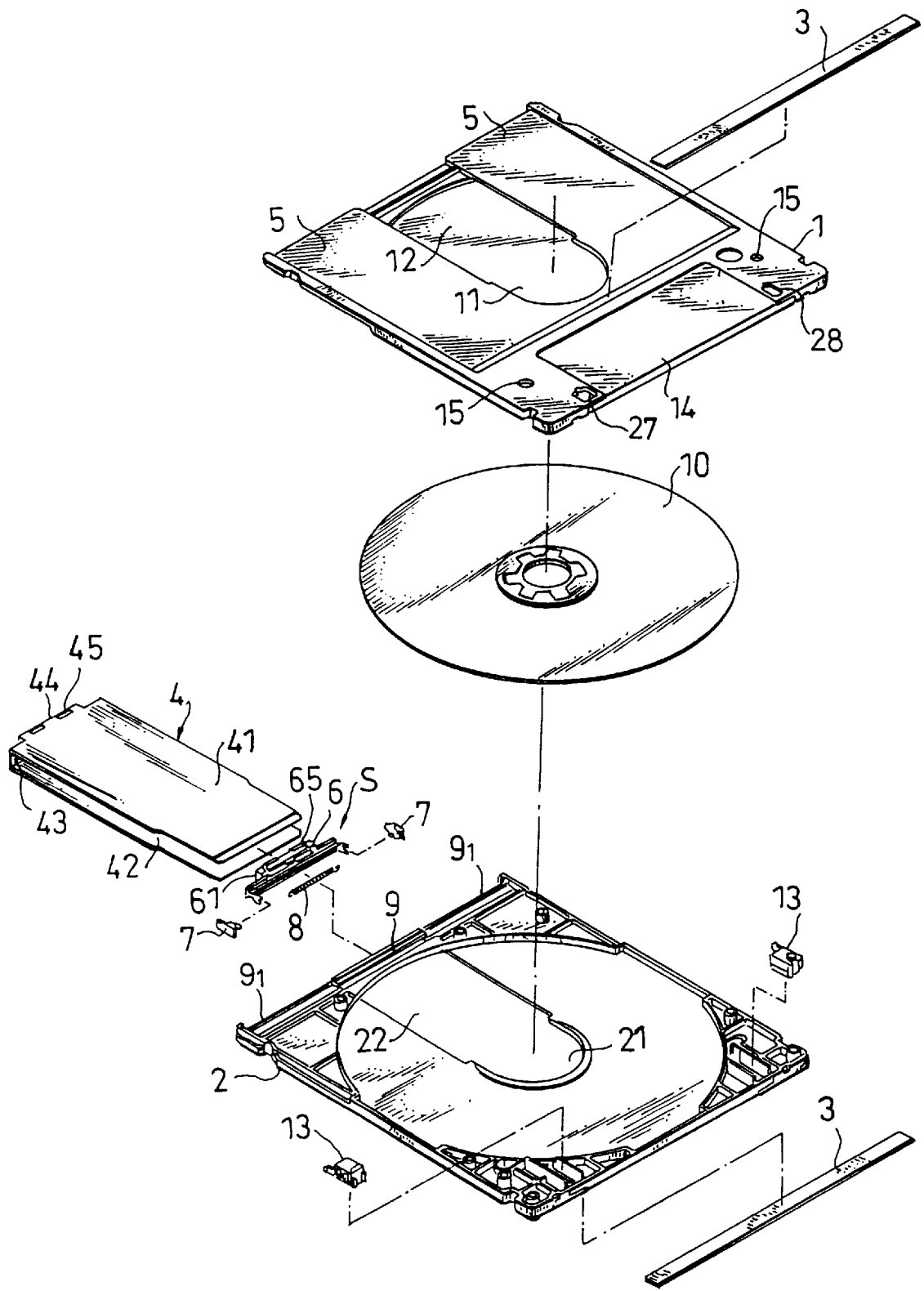
FIG. 6 is an exploded perspective view showing a second embodiment of a disc cartridge according to the present invention.
Figure 8A:
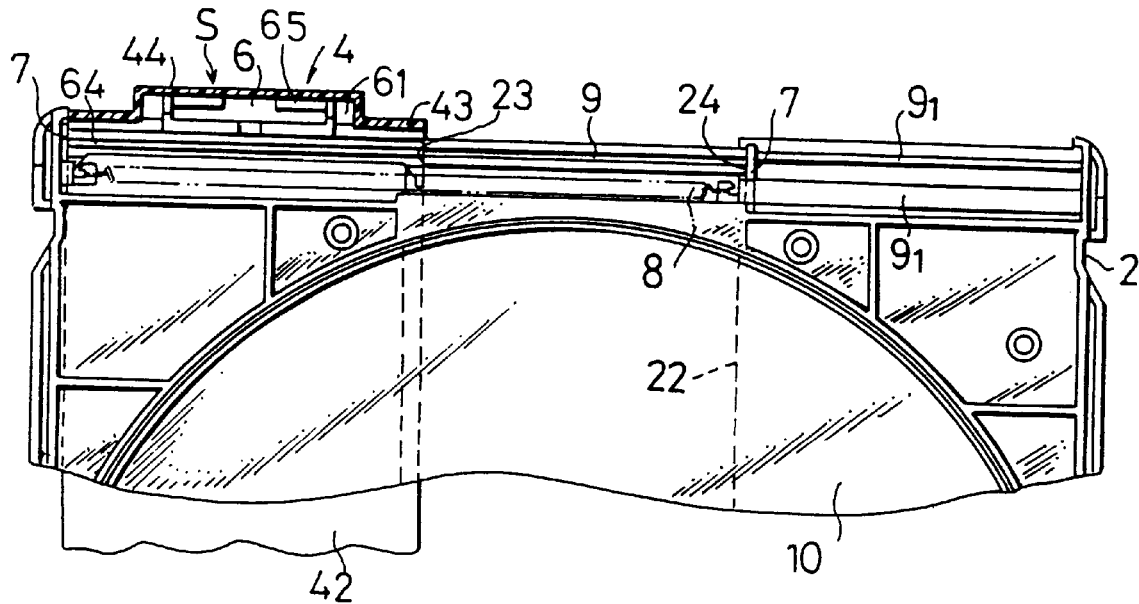
FIG. 8A is a fragmentary enlarged plan view partly in section showing operation of the shutter, wherein the shutter is kept at an opening position in a left-hand direction.
Figure 8B:
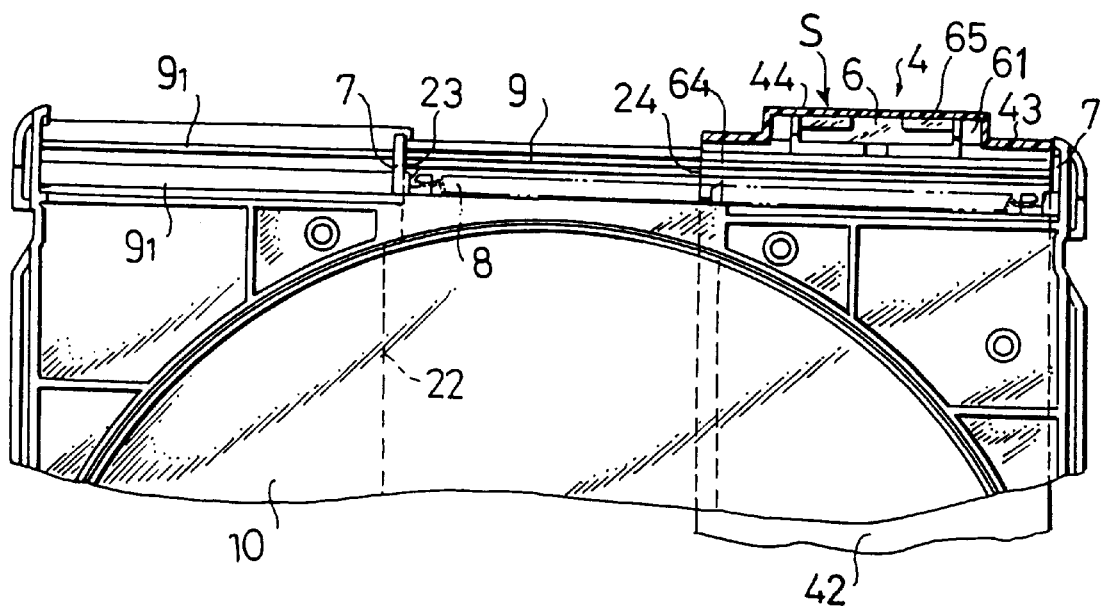
FIG. 8B is a fragmentary enlarged plan view partly in section showing operation of the shutter, wherein the shutter is kept at an opening position in a right-hand direction.
Figure 9:
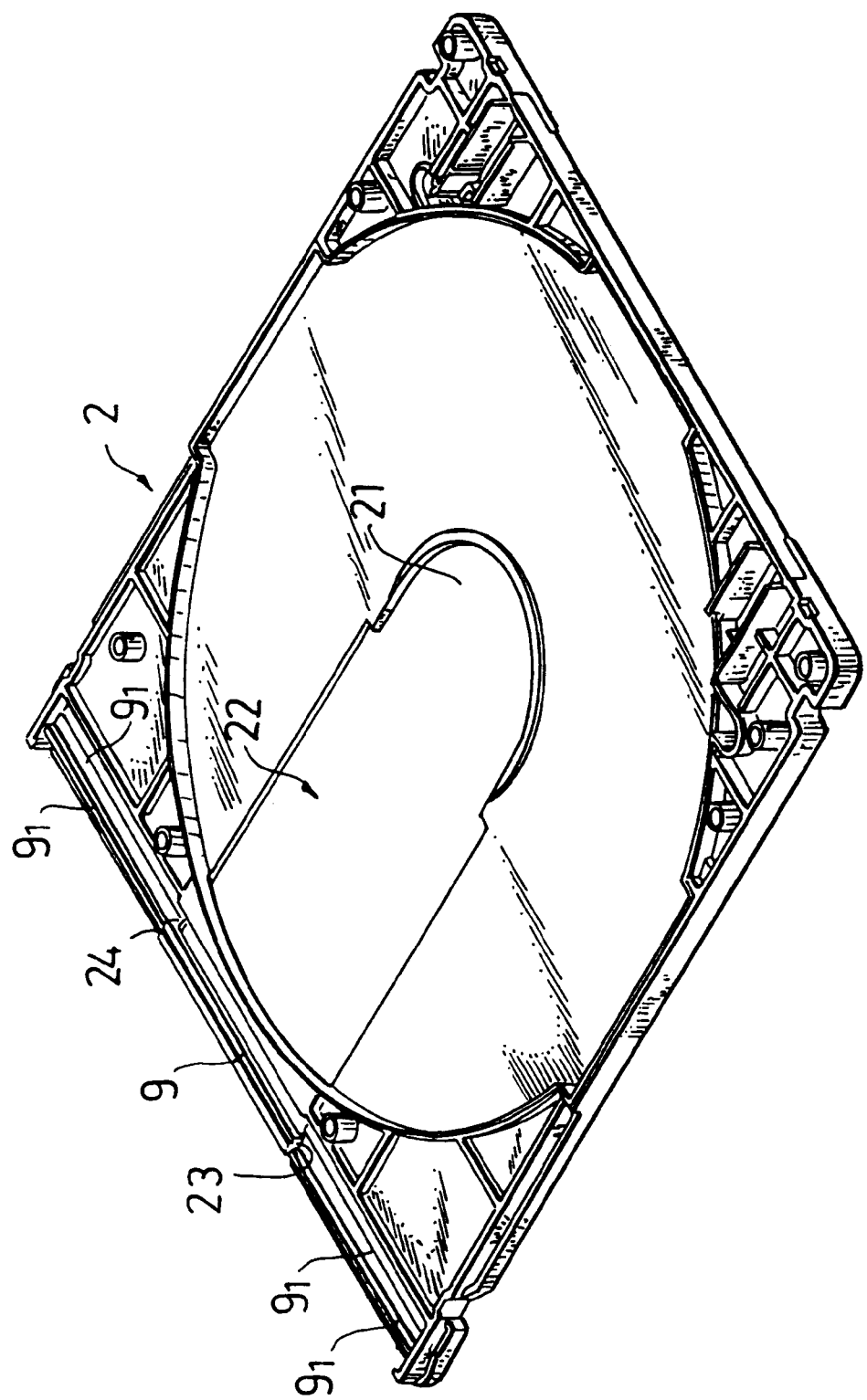
FIG. 9 is an enlarged perspective view showing a lower casing member of a casing of the disc cartridge shown in FIG. 6.
Figure 10:
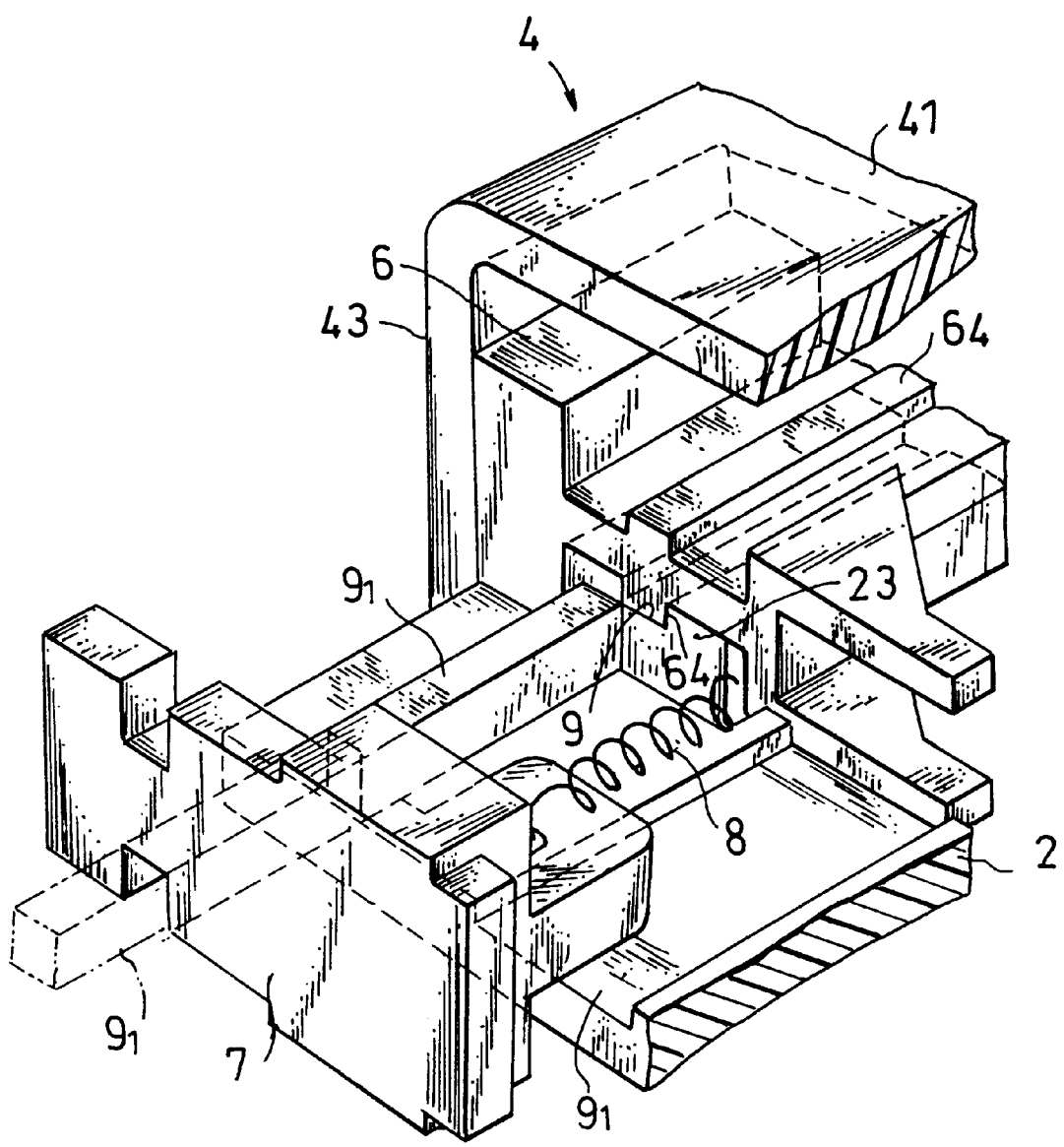
FIG. 10 is a fragmentary perspective view partly in section showing an essential part of the disc cartridge of FIG. 6.

Referring first to FIGS. 1 to 3, a first embodiment of a disc cartridge according to the present invention is illustrated. A disc cartridge of the illustrated embodiment is constructed so as to receive a double-sided recordable/reproducible optical disc therein. The disc cartridge includes a casing constructed of an upper casing member 1 and a lower casing member 2 joined to each other, as well as a double-sided recordable/reproducible disc-like medium or disc 10 rotatably received in the casing. The casing is formed with openings including drive shaft insertion holes 11 and 21 and head insertion holes 12 and 22. Also, the casing is formed on an outer surface thereof with a shutter slide region 5 in a manner to be recessed from a level of the outer surface, on which a shutter 4 for opening and closing the openings is slidably fitted. The shutter 4 includes an upper plate 41, a lower plate 42, and a connection 43 for connecting the upper and lower plates 41 and 42 to each other therethrough and is formed with a substantially U-shape in section. Also, the disc cartridge includes a slider S for sliding the shutter 4 and an elastic member or spring 8 for urging the slider S in a closing direction to close the openings. The connection 43 of the shutter 4 is provided with a lug 44 with which a shutter operation member A of a recording/reproducing apparatus in which the disc cartridge is operated. The slider S is arranged in the shutter 4 in a manner to be abutted against an inner surface of the lug 44.

In the illustrated embodiment, the shutter slide region 5 of the casing recessed from the outer surface of the casing is provided with guides 3, each of which is fixed on the region 5 by fusion bonding or by means of an adhesive so as to act as a holder for holding a free end of a corresponding one of the upper and lower plates 41 and 42 of the shutter 4. The slider S which is arranged in the shutter 4 so as to slide along a front end of the casing constructed of the upper and lower casing members 1 and 2 is provided on each of opposite ends thereof with a reinforcement 61 for reinforcing the lug 44 against which the shutter operation member A is abutted. The reinforcements 61 of the slider S are in contact with the inner surface of the lug 44 without forming any gap therebetween, to thereby reinforce the lug 44. Also, in order to facilitate assembling between the shutter 4 and the slider S, the shutter 4 is provided with mounting holes 45 and correspondingly the slider S is provided with projections 65 adapted to be fitted in the mounting holes 45.

The shutter 4 is fixed on the slider S. The slider S is provided thereon with strip-like projections 62 acting as a guide and the casing is formed on an inner surface thereof with guide grooves G adapted to be engaged with the respective projections 62 of the slider S, so that the shutter 4 may be slidably guided between an opening position at which the shutter 4 render the above-described holes 11, 21 and 12, 22 of the casing open and a closing position at which it closes the holes. The shutter 4 is formed of polyacetal resin or the like with a substantially U-shape in section by injection molding. Use of resin for the shutter 4 permits the shutter to be reduced in both cost and weight as compared with use of metal such as, for example, stainless steel, surface treated aluminum or the like therefor. Also, it facilitates formation of the shutter into a complicated configuration.

Such properties of resin are utilized for providing the shutter 4 which is so constructed that the connection 43 is provided at an intermediate portion thereof with the lug 44 against which the shutter operation member A of the recording/reproducing apparatus is abutted. The slider S arranged in the shutter 4, as described above, serves to guide sliding of the shutter 4. The slider S is provided with the reinforcements 61 for reinforcing the portions of the shutter 4 against which the shutter operation member A is abutted. Such construction permits the shutter 4 to exhibit increased dimensional stability and be free from any deterioration in appearance such as surface sink or the like while reducing a thickness thereof.

The slider S is provided on one end thereof with a spring holding section 63 for holding the elastic member or spring 8. Also, the projections 65 which are engagedly fitted in the mounting holes 45 of the shutter 4 are arranged on upper and lower surfaces of the slider S. Such construction ensures secure integral connection between the slider S and the shutter 4 and constant urging of the shutter 4 in the closing direction. Assembling of the slider S and shutter 4 in the casing may be carried out by incorporating the slider S in the lower casing member 2 together with the elastic member 8 and joining the upper casing member 1 to the lower casing member 2, followed by securely mounting of the shutter 4 on the slider S. Alternatively, it may be executed by incorporating the slider S in the lower casing member 2 and joining the upper casing member 1 to the lower casing member 2, followed by mounting of the shutter 4 and elastic member or spring 8 in the casing. Thus, the disc cartridge of the illustrated embodiment permits a degree of freedom in assembling of the disc cartridge to be increased, to thereby facilitate the assembling.

In the illustrated embodiment, the elastic member or spring 8 is constituted by a torsion spring. Alternatively, a coiled spring may be used therefor. The slider S is abutted against the inner surface of the lug 44 provided on the connection 43 of the resin shutter 8.

The illustrated embodiment may be effectively applied to a disc cartridge including a double-direction sliding shutter structure wherein a shutter is operated in both lateral directions of the casing as well as that including a single-direction sliding shutter structure.

In FIG. 1, reference numeral 13 designates two erasure prevention members for selectively setting the disc at a "recordable" or "unrecordable" state, which are arranged slidably and in a manner to be independent from each other as described hereinafter. Reference numerals 14 and 20 designate a label area and a clamping plate for the disc, respectively.

In the disc cartridge of the illustrated embodiment, as described above, the shutter 4 which is made of a synthetic resin material and formed with a substantially U-shape in section is arranged so as to slide along the front end of the casing consisting of the upper and lower casing members 1 and 2. The slider S fixed in the shutter 4 slidably guides it along the guide grooves G on the inner surface of the casing so as to permit the shutter 4 to be slidably moved between the opening position and the closing position. The shutter 4 is so constructed that the connection 43 is provided at the intermediate portion thereof with the lug 44, resulting in a step being defined between each of both ends of the lug 44 and a portion of the connection 43 other than the lug 44, so that the shutter operation member A of the recording/reproducing apparatus is abutted against the step. This ensures smooth movement of the shutter 4 and increased dimensional stability thereof while relatively reducing a thickness of the shutter 4. Also, it permits the shutter 4 to be free from any deterioration in appearance such as surface sink or the like.

As can be seen from the foregoing, the disc cartridge of the illustrated embodiment is so constructed that the connection 43 of the shutter 4 is provided with the lug 44 with which the shutter operation member A is abuttedly engaged and the slider S is arranged in a manner to be fitted in the lug 44 of the connection 43 of the shutter 4 while being abutted against the inner surface of the lug 44. Such construction permits the disc cartridge to be applied to both a double-direction sliding shutter structure and a single-direction sliding shutter structure while keeping the shutter 4 from being increased in size and ensuring use of inexpensive resin for the shutter. Also, it permits the shutter 4 to exhibit both increased reliability in operation and increased strength. Further, it ensures that the disc cartridge is manufactured with ease and at a reduced cost by means of a molding die.

Now, the two erasure prevention members 13 respectively arranged in correspondence to the upper and lower sides or surfaces of the disc in a manner to be movable will be described with reference to FIGS. 4A to 5B. The erasure prevention members 13 are formed with the same configuration and received in receiving sections 30 and 31 formed in the casing while being orientated vertically inversely to each other. The receiving sections 30 and 31 are defined by partition walls 32 and 33 arranged in the casing so as to inwardly extend from an inner surface of any one of the upper and lower casing members 1 and 2, respectively. In the illustrated embodiment, the partition walls 32 and 33 are arranged on the inner surface of the lower casing member 2. Also, the lower casing member 2 is provided on the inner surface thereof with stoppers 34 and 35 for setting a range of movement of each of the erasure prevention members 13.

The erasure prevention members 13 are each provided with a pair of abutments 36 which are adapted to be abutted against the stopper 35. The erasure prevention members 13 are each provided on one of surfaces thereof with an operation portion 37 operated by a finger of a user and on another surface thereof opposite to the one surface with an identification detection portion 38 for miserasure prevention. The erasure prevention members 13 may each be formed on the one surface thereof on which the operation portion 37 is arranged with an operation hole 39 into which a pen point or the like is inserted, as required. The stopper 34 is arranged in the form of an L-shaped wall, which is so formed that one of surfaces parallel to the partition wall acts as a guide surface for an elastic arm $13_1$ to thereby prevent the elastic arm $13_1$ from being abnormally deformed. The stoppers 34 and 35 may be formed so as to extend beyond a parting surface, as required. Reference numeral 28 designates a guide hole in which the identification detection portion 38 is guided.

A clearance between the identification detection portion 38 and the guide hole 28 may be reduced as desired, so that miserasure may be more effectively prevented because the erasure prevention member 13 is kept from being operated at this portion.

The partition walls 32 and 33 are each formed with a recess $13_3$ by which a lock portion $13_2$ provided on the erasure prevention member 13 through the elastic arm $13_1$ is held at either a recordable position or an unrecordable position.

In general, a lower surface side of a disc defined when a user puts a disc cartridge on a hand acts as a recording/reproducing side of the disc because an optical pickup is arranged on a bottom side of the recording/reproducing apparatus. This results in discrimination or identification of correspondence between two erasure prevention members and both sides or surfaces of the disc being highly difficult. In the illustrated embodiment, the number of erasure prevention members 13 which can be operated on an upper side or surface of the disc cartridge defined when a user puts it on his or her hand is only one, to thereby effectively prevent miserasure of the disc.

Also, in the illustrated embodiment, the receiving sections 30 and 31 for receiving the erasure prevention members 13 therein are provided in the lower casing member 2, so that all the remaining parts of the disc cartridge may be incorporated in the lower casing member 2 during assembling of the disc cartridge. Further, the stoppers 34 and 35 for defining both recordable and unrecordable positions of each of the erasure prevention members 13 are arranged in the lower casing member 2, so that the abutments 36 of each of the erasure prevention members 13 abutted against the stopper 35 may be formed with a height He more than one half as large as that $H_A$ of the erasure prevention member 13 ($HB_B > \frac{1}{2}H_A$). Such arrangement permits the abutments 36 to be positively abutted against the stopper 35 irrespective of any manner of orientation of the disc cartridge in a vertical direction. The upper casing member 1 may be so constructed that a wall thereof is retracted from the lower casing member 2 so as not to interfere with movement of the erasure prevention members 13. Alternatively, it may not be provided with such a wall.

As can be seen from the foregoing, in the illustrated embodiment, two such erasure prevention members 13 which are formed with the same configuration are arranged in correspondence to the upper and lower sides or surfaces of the disc 10, respectively. Also, the partition walls 32 and 33 are arranged in one of the upper and lower casing members 1 and 2 in a manner to vertically extend from the inner surface of the casing member, so that the receiving sections 30 and 31 for receiving the erasure prevention members 13 while orientating them vertically inversely to each other are arranged in the one casing member. Further, the stoppers 34 and 35 for setting a range of movement of each of the erasure prevention members 13 are arranged in the casing member in which the partition walls 32 and 33 are arranged. Such construction facilitates assembling of the erasure prevention mechanism and permits correspondence between the erasure prevention members 13 and the surfaces of the disc 10 to be immediately readily identified. Also, it facilitates handling of the mechanism and therefore the disc cartridge and ensures efficient and inexpensive manufacturing of the disc cartridge.

Referring now to FIGS. 6 to 10, a second embodiment of a disc cartridge according to the present invention is illustrated. A disc cartridge of the illustrated embodiment includes a slider S arranged in a shutter 4 so as to slidably guide the shutter 4 and an elastic member or spring 8 arranged in the shutter 4 so as to urge the slider S in a closing direction. The slider S includes a first slider member 6 which slides while being engaged with at least one first guide section 9 provided on upper and lower casing members 1 and 2 of a casing and a pair of second slider members 7 which slide while being engaged with respective second guide sections $9_1$ provided on the upper and lower casing members 1 and 2 and are arranged on opposite ends of the first slider member 6 so as to interpose the first slider member 6 therebetween while being pressed against the first slider member 6 by means of the spring 8. In the illustrated embodiment, one such first guide section 9 is provided. The casing is provided with a pair of stopper projections 23 and 24 which are positioned at opposite ends of the openings formed at a central portion of a front wall of the casing. The second slider members 7 are arranged in a manner to be disengageably pressedly abutted against the stopper projections 23 and 24, respectively, so that the shutter 4 may be slidably moved in both lateral directions of the casing.

The first slider member 6 and second slider members 7 are each formed to be symmetric in a vertical direction and the second slider members 7 are arranged so as to pressedly interpose the first slider member 6 therebetween by means of the spring 8. The first and second slider members 6 and 7 are incorporated in one of the upper and lower casing members 1 and 2 and then the upper and lower casing members are joined to each other. Then, the shutter 4 is fixed to the first slider member 6 so that the shutter 4 and slider S may be concurrently moved. The spring 8 acts to constantly urge the first slider member 6 in the closing direction.

In the illustrated embodiment, a shutter slide region 5 formed on the casing in a manner to be recessed from an outer surface of the casing is provided with guides 3, each of which is fixed on the region 5 by fusion bonding or by means of an adhesive so as to act as a holder for holding a free end of each of upper and lower plates 41 and 42 of the shutter 4. The first slider member 6 which is arranged in the shutter 4 so as to slide along a front end of the casing while straddling the front end is provided on each of the opposite ends thereof with a reinforcement 61 for reinforcing a lug 44 of the shutter 4 described hereinafter against which lug a shutter operation member A of a recording/reproducing apparatus is abutted. Also, in order to facilitate assembling between the shutter 4 and the first slider member 6, the shutter 4 is provided with mounting holes 45 and correspondingly the first slider member 6 is provided with projections 65 adapted to be respectively fitted in the mounting holes 45.

In the illustrated embodiment, the shutter 4 is fixedly connected to the first slider member 6. The first slider 6 acts to slidably guide the shutter 4 between a closing position and an opening position through engagement of guide projections 64 of the first slider member 6 with guide grooves 9 formed in an inner surface of the casing.

The first slider member 6 is arranged in the shutter 4 so as to slidably guide the shutter 4. Also, the first slider member 6 is provided on each of the opposite ends thereof with the above-described reinforcement 61 in a manner to be kept in contact with an inner surface of the lug 44 of the shutter 4 against which lug the shutter operation member A of the recording/reproducing apparatus is abutted. Such construction ensures smooth movement of the shutter 4 and increased dimensional stability thereof while relatively reducing a thickness of the shutter 4. Also, it permits the shutter 4 to be free from any deterioration in appearance such as surface sink or the like. In addition, the shutter 4 and first slider 6 may be constructed in a manner to be independent from each other, so that an interior of the shutter 4 is free from any ruggedness. This permits a molding die for the shutter 4 to be simplified in structure to a degree sufficient to strengthen die parts for a center core of the molding die. Also, it effectively prevents a failure in molding of the shutter 4 due to non-uniformity in thickness of upper and lower plates 41 and 42 of the shutter 4. Further, the stopper projections 23 and 24 for stopping movement of the second slider members 7 prevent them from pulling against each other at the closing position, to thereby stabilize closing operation of the shutter 4. When the shutter 4 is kept open, the first slider member 6 and one of the second slider members 7 are abutted against each other to apply a restoring force of the spring 8 to the first slider member 7.

In the illustrated embodiment, the elastic member or spring 8 is constituted by a coiled extension spring. The first slider member 6 is arranged in a manner to be abutted against an inner surface of the lug 44 provided at a connection 43 of the resin shutter 4.

The remaining part of the second embodiment may be constructed in substantially the same manner as the first embodiment described above. Reference numeral 15 designates a hole for positioning the disc cartridge.

Thus, in the illustrated embodiment, the shutter 4 which is formed with a substantially U-shape in section is constructed so as to slide along the front end of the casing while straddling the front end, during which the slider S fixed in the shutter 4 slidably guides the shutter 4 along the guide groove on the inner surface of the casing between the opening position and the closing position. The shutter 4 is slidably guided by the first slider member 6 which slides while being engaged with the guide section 9 of the casing. Also, the spring 8 arranged in the casing is engaged with the second slider members 7 arranged so as to be movable substantially at respective opposite ends of the shutter 4 in a width direction thereof. Thus, when the shutter 4 is moved to a left-hand opening position, left-hand one of the second slider members 7 is abutted against the first slider member 6 to apply a restoring force of the spring 8 to the first slider member 6 in the closing direction and the right-hand second slider member 7 is abutted against the stopper projection 24 of the casing. More specifically, the second slider members 7 are arranged so as to pressedly interpose the first slider member 6 therebetween by an elastic force of the coiled extension spring 8, so that the second slider members 7 may be incorporated in one of the upper and lower casing members 1 and 2 while being kept engaged with both ends of the first slider member 6. Then, the upper and lower casing members 1 and 2 are jointed to each other, followed by fixing of the shutter 4 to the first slider member 6. Thus, assembling of the disc cartridge is facilitated with increased efficiency while ensuring smooth movement of the shutter 4 and increased durability thereof.

As can be seen from the foregoing, the second embodiment is so constructed that the slider S includes the first slider member 6 which slides while being engaged with the first guide section 9 provided on the casing and a pair of the second slider members 7 which slide while being engaged with the second guide sections $9_1$ provided on the casing and are arranged on the opposite ends of the first slider member 6 so as to interpose the first slider member 6 therebetween while being pressed against the first slider member 6 by means of the spring 8. Also, the casing is provided with a pair of the stopper projections 23 and 24 which are positioned at the opposite ends of the openings formed at a central portion of the front end of the casing, wherein the second slider members 7 are arranged in a manner to be disengageably pressedly abutted against the stopper projections 23 and 24, respectively. Thus, the first and second slider members 6 and 7 are first assembled together with the spring 8 to form a subassembly and then the subassembly is incorporated in one of the upper and lower casing members 1 and 2, followed by joining the other casing member to the one casing member. This results in assembling of the disc cartridge being highly improved while minimizing a failure in assembling thereof. Also, it permits the disc cartridge to exhibit increased durability and ensure improved shutter operation.

Figure 11:
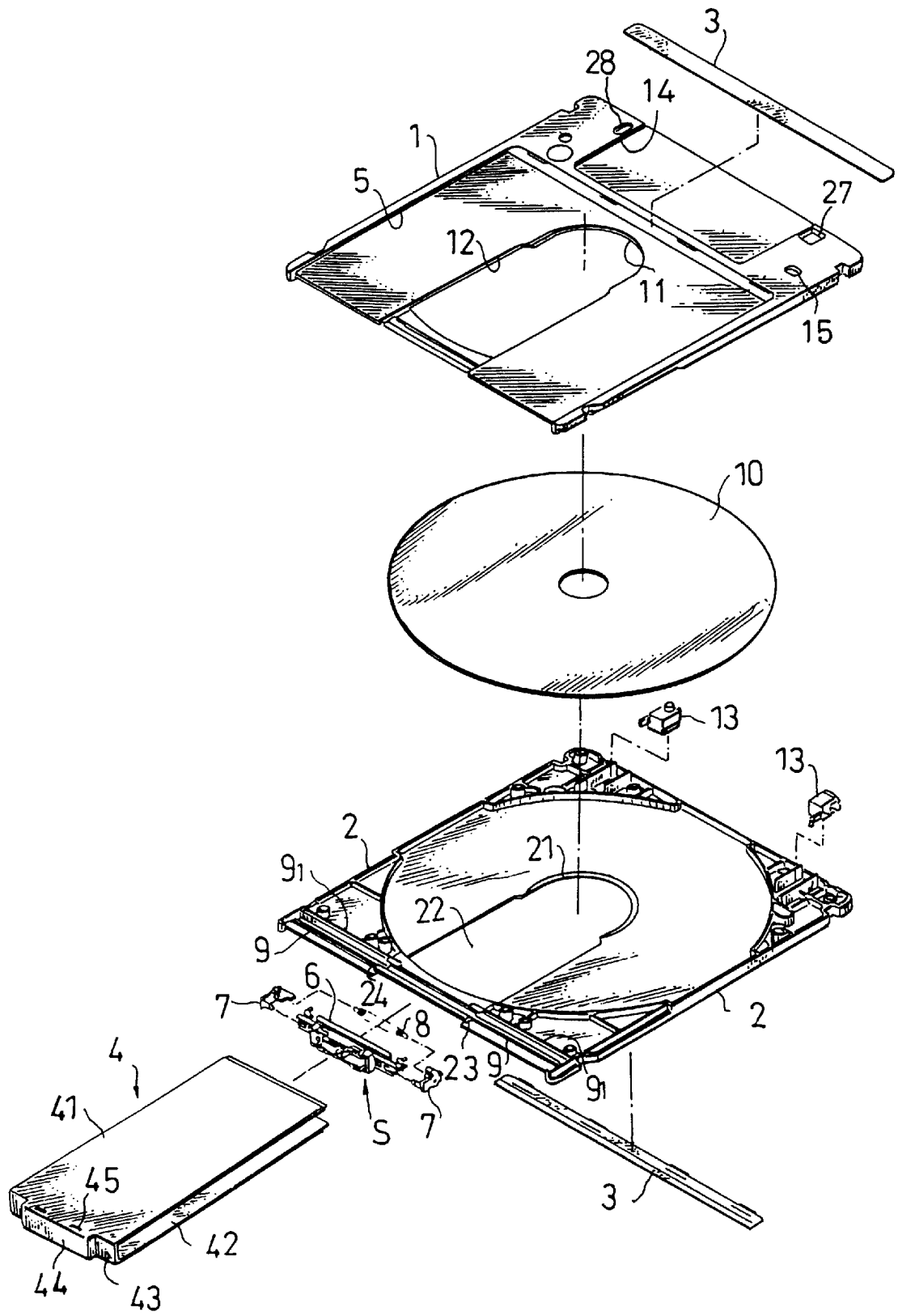
FIG. 11 is an exploded perspective view showing a third embodiment of a disc cartridge according to the present invention.
Figure 12:
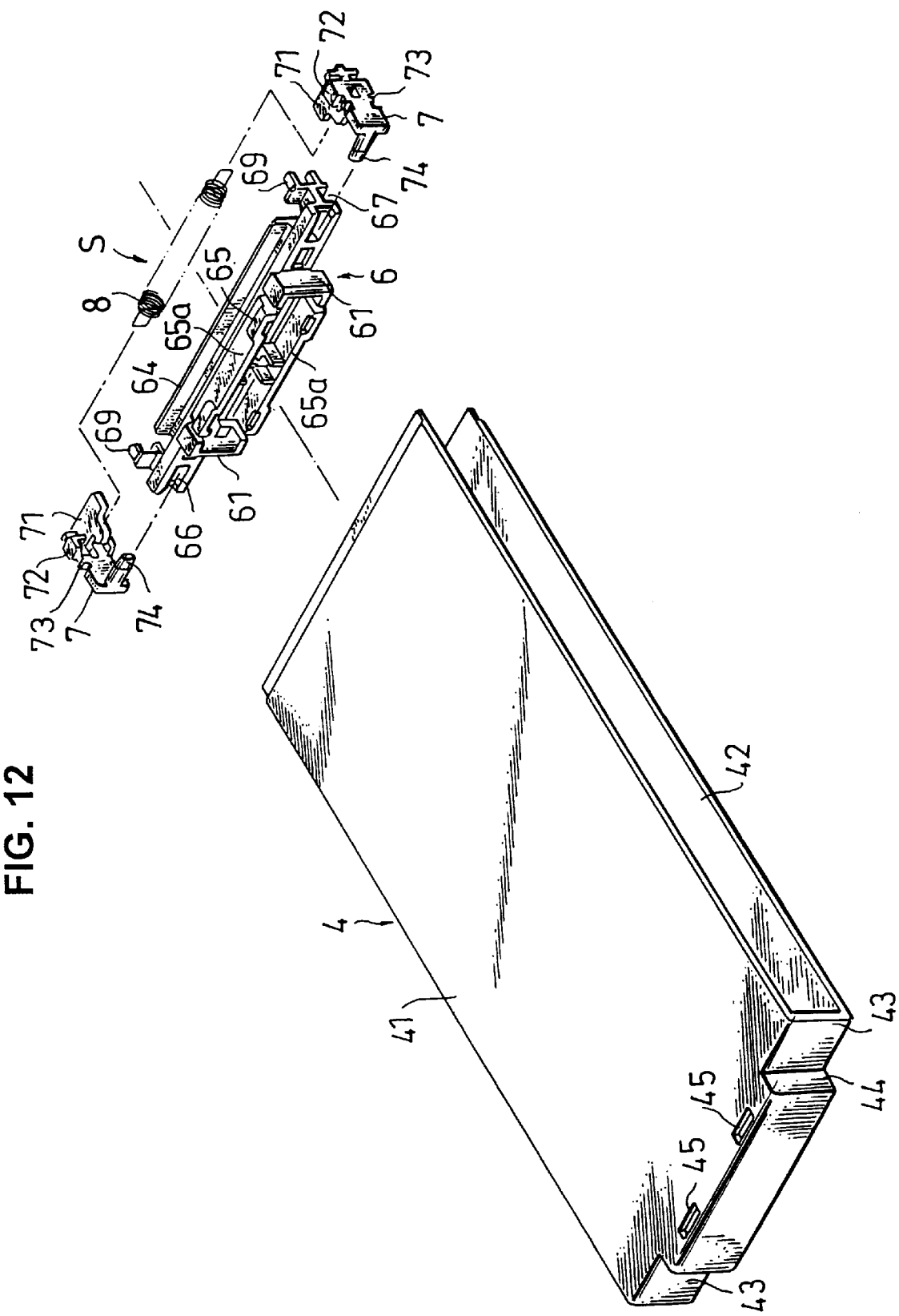
FIG. 12 is an enlarged exploded perspective view showing a shutter and a slider incorporated in the disc cartridge shown in FIG. 11.
Figure 13B:
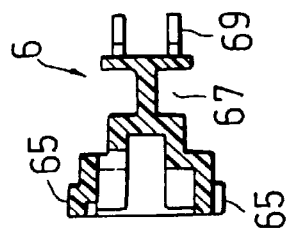
FIG. 13B is a vertical sectional view taken along line 13B—13B of FIG. 13A.
Figure 13D:
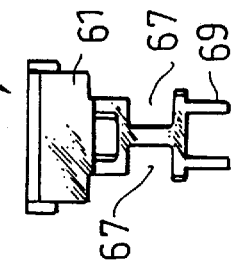
FIGS. 13C, 13D and 13E are a plan view, a side elevation view and a bottom view of the first slider member shown in FIG. 13A, respectively.
Figure 13A:
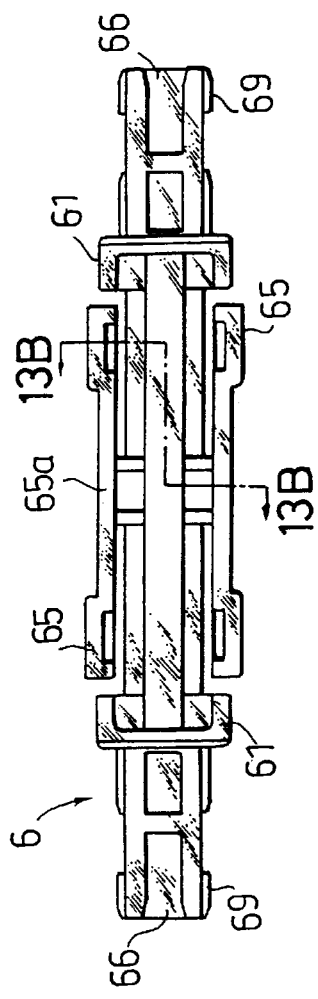
FIG. 13A is a front elevation view showing a first slider member of the slider incorporated in the disc cartridge shown in FIG. 11.
Figure 13C:
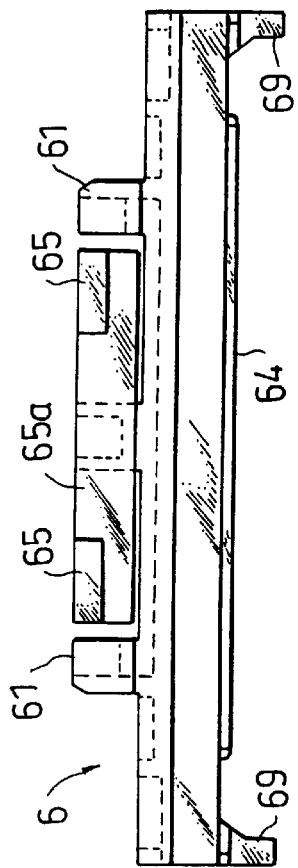
Figure 13E:
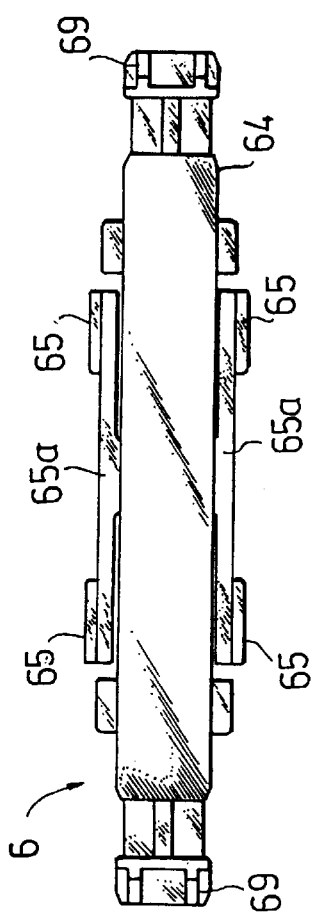
Figure 14A:
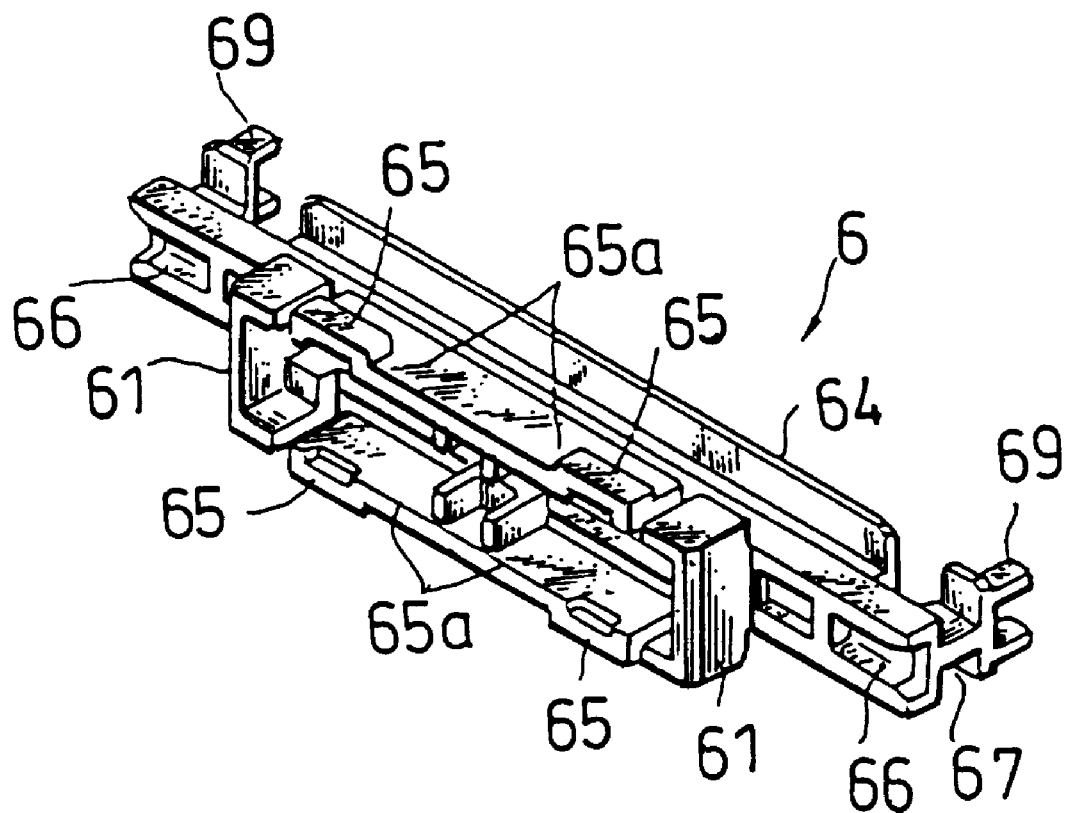
FIG. 14A is a perspective view generally showing the first slider member of FIG. 13A.
Figure 14B:
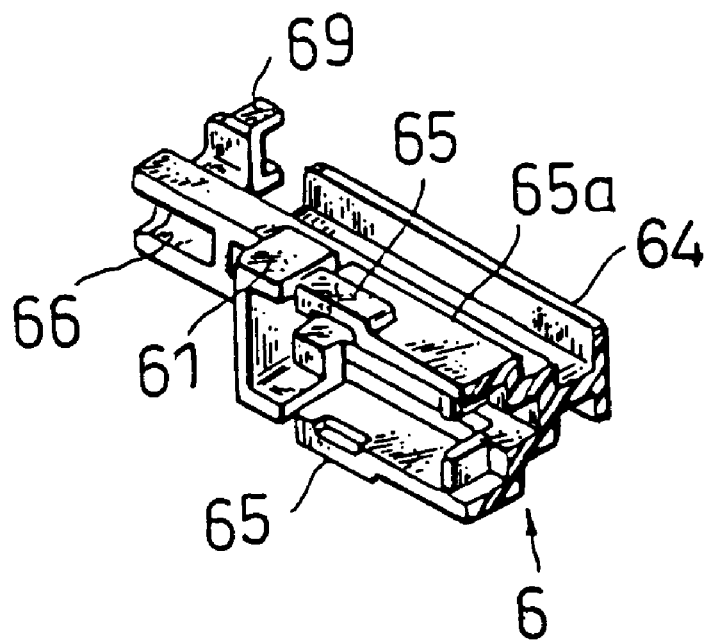
FIG. 14B is a fragmentary perspective view of the first slider member shown in FIG. 13A.
Figure 15A:
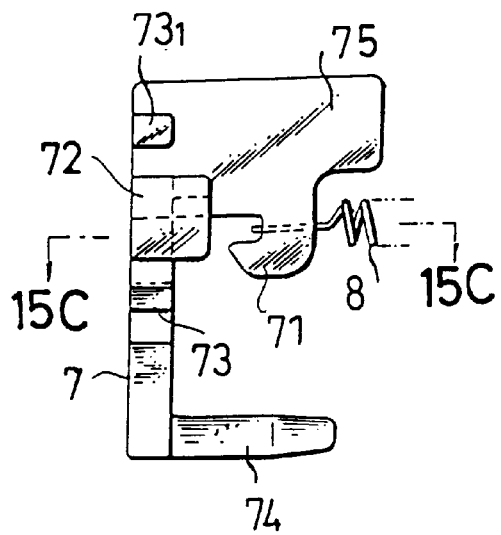
FIGS. 15A and 15B are a plan view and a front elevation view showing each of second slider members of the slider incorporated in the disc cartridge shown in FIG. 11, respectively.
Figure 15B:
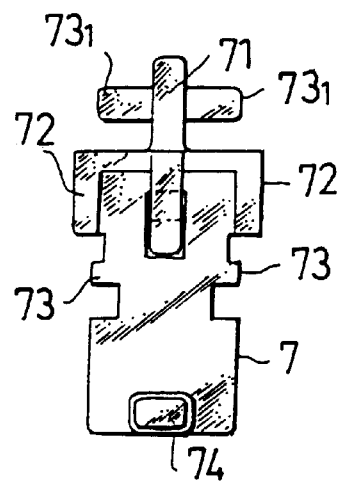
Figure 15C:
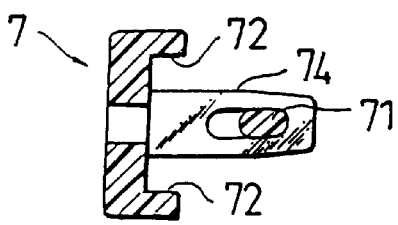
FIG. 15C is a sectional plan view taken along line 15C—15C of FIG. 15A.
Figure 15D:
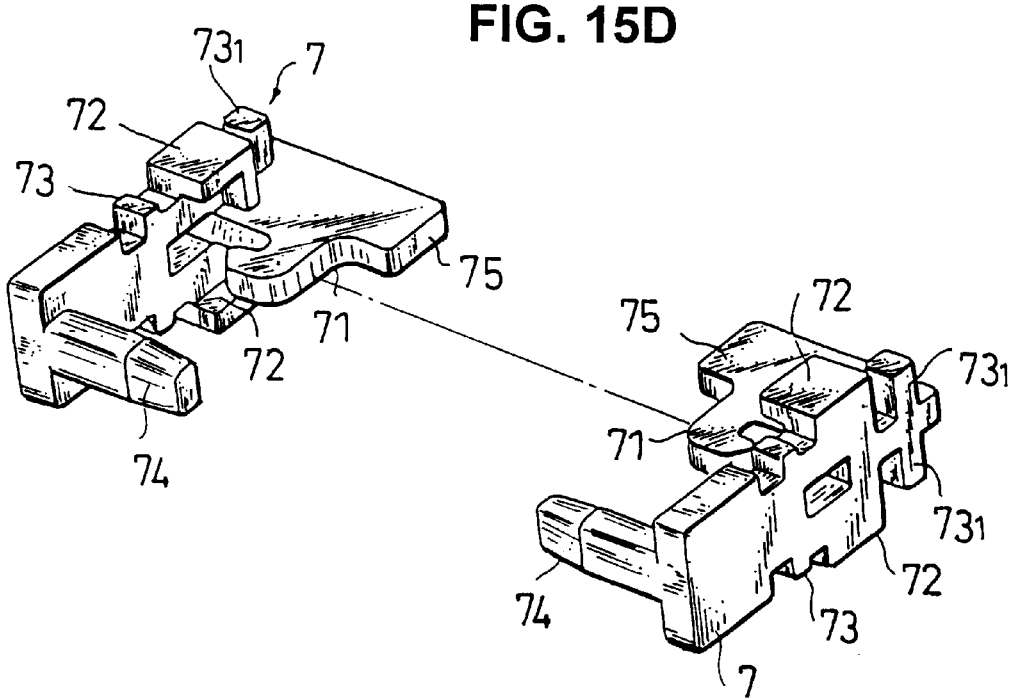
FIG. 15D is a perspective view of a pair of the second slider members of FIG. 15A.

Referring now to FIGS. 11 to 16B, a third embodiment of a disc cartridge according to the present invention is illustrated. A disc cartridge of the illustrated embodiment likewise includes a slider S arranged in a shutter 4 so as to slidably guide the shutter 4 and an elastic member or spring 8 arranged in the shutter 4 so as to constantly urge the slider S in a closing direction. The slider S likewise includes a first slider member 6 which slides while being engaged with a pair of first guide sections 9 provided on a casing consisting of upper and lower casing members 1 and 2 so as to be spaced from each other in a lateral direction of the casing as shown in FIG. 11 and a pair of second slider members 7 which slide while being engaged with second guide sections $9_1$ provided on the upper and lower casing members 1 and 2 and are arranged on the opposite ends of the first slider member 6 so as to interpose the first slider member 6 therebetween while being pressed against the first slider member 6 by means of the spring 8. The second slider members 7 are each provided thereon with a spring holder 71, which is provided on both sides thereof with covering walls 72 in which an end of the first slider member 6 is fitted. For example, the covering walls 72 may each be formed with an inverted L-shape in section so as to cover the end of the first slider member 6. The covering walls 72 may be arranged on both sides of the spring holder 71 in a manner to be opposite to each other about the spring holder 71. The second slider members 7 are pressedly abutted against the first slider member 6 in a manner to be disengageable therefrom. The casing is provided with a pair of stopper projections 23 and 24 which are positioned at the opposite ends of the openings formed at a central portion of a front end of the casing. The second slider members 7 are selectively engaged with the respective stopper projections 23 and 24, so that sliding movement of the second slider members 7 is stopped, resulting in the shutter 4 being slidably moved in both lateral directions of the disc cartridge.

In the illustrated embodiment, the first slider member 6 is provided on each of the opposite ends thereof with a holding section 69 which is formed with a U-shape in section. The U-shaped holding section 69 is so formed that a space or gap sufficient to permit the spring 8 to be inserted therethrough is defined therein. The spring 8 for urging the second slider members 7 in a direction to pull against each other is constituted by a coiled extension spring. The spring 8 is so arranged that a center thereof is substantially aligned with a center of a space defined by the covering walls 72, resulting in ensuring smooth movement of the shutter 4. Also, a shutter slide region 5 formed on the casing in a manner to be recessed from an outer surface of the casing is provided with guides 3, each of which is fixed on the region 5 by fusion bonding or by means of an adhesive so as to act as a holder for holding a free end of each of upper and lower plates 41 and 42 of the shutter 4. The first slider member 6 which is arranged in the shutter 4 so as to slide along the front end of the casing while straddling the front end is provided on each of the opposite ends thereof with a reinforcement 61 for reinforcing a lug 44 of the shutter 4 against which a shutter operation member A of a recording/reproducing apparatus is abutted. Also, in order to facilitate assembling between the shutter 4 and the first slider member 6, the shutter 4 is provided with mounting holes 45 and correspondingly the first slider member 6 is provided with projections 65 adapted to be fitted in the respective mounting holes 45.

The first slider member 6, as shown in FIGS. 12 to 14B, is provided on each of the opposite ends thereof with the above-described U-shaped section 69, which is formed therein with the gap through which the spring 8 is inserted, as described above. The first slider member 6 is also provided at an intermediate portion thereof with the projections 65, which are fitted in the mounting holes 45 of the lug 44 of the shutter 4. Also, the first slider member 6 is provided thereon with elastic arms 65a in a manner to be positioned between the projections 65 laterally adjacent to each other. The projections 65 and elastic arms 65a cooperate with each other to securely mount the first slider member 6 in the shutter 4. The second slider members 7, as shown in FIGS. 15A to 15D, each include the spring holder 71 on which the spring 8 is held, as well as the covering walls 72 adapted to cover the U-shaped section 69 of the first slider member 6, as described above. Also, the second slider members 7 are each provided thereon with strip-like projections or rails 73 and $73_1$ respectively fitted in the guide sections 9 and $9_1$ on the inner surface of the casing and a support rod 74 fitted in a recess 66 of the first slider member 6, so that the first and second slider members 6 and 7 cooperate together to ensure smooth movement of the shutter 4 and improve durability thereof. Such construction of the first and second slider members 6 and 7 permits the slider members 6 and 7 to carry out smooth shutter opening operation. In addition, it facilitates incorporation of the first and second slider members 6 and 7 and spring 8 in the casing.

Also, each of the ends of the first slider member 6 which is covered with the covering walls 72 of a corresponding one of the second slider members 7 and pressedly abutted against the second slider members 7 is constructed in the form of the above-described substantially U-shaped section 69. The covering walls 72 are so arranged that a center of the space defined thereby is aligned with that of the coiled spring 8 as described above. Such construction and arrangement permit temporary assembling of the slider S and spring 8 during assembling of the disc cartridge to be stabilized and stable operation of the shutter 4 after the assembling to be ensured.

The shutter 4 is fixedly connected to the first slider member 6. For example, the illustrated embodiment may be so constructed that strip-like projections 64 of the first slider member 6 acting as a guide and the first guide section 9 of the casing cooperate with each other to permit the shutter 4 to be slidably moved between a closing position and an opening position.

In the illustrated embodiment, as described above, the first slider member 6 is pressedly interposed between a pair of the second slider members 7 by means of the spring 8 and the covering walls 72 of the second slider members 7 fittedly hold both ends of the first slider member 6, so that the second slider members 7 may be incorporated in one of the upper and lower casing members 1 and 2 while being kept engaged with the opposite ends of the first slider member 6 against an elastic restoring force of the spring 8. Then, the upper and lower casing members 1 and 2 are joined to each other, followed by fixing of the shutter 4 on the first slider member 6. Thus, the disc cartridge of the illustrated embodiment substantially facilitates assembling thereof. Each of the ends of the first slider member 6 which is held by the covering walls 72 of a corresponding one of the second slider members 7 is formed with a substantially U-shape in section so as to permit the spring 8 to be inserted therethrough and a coiled extension spring is used as the spring 8. In addition, the coiled spring 8 is so arranged that a center thereof is substantially aligned with that of the space defined by the covering walls 72. Such construction ensures smooth movement of the shutter 4 and increased durability thereof.

As can be seen from the foregoing, the disc cartridge of the illustrated embodiment is so constructed that the spring holder 71 of each of the second slider members 7 is provided on both sides thereof with the covering walls 72 in which the first slider member 6 is fitted at a corresponding one of the ends thereof. Thus, the first slider member 6, second slider members 7 and spring 8 are previously assembled into a subassembly, which is then incorporated in one of the upper and lower casing members 1 and 2, followed by joining of both casing members 1 and 2 to each other. Therefore, the illustrated embodiment highly facilitates assembling thereof and minimizes a failure in assembling thereof. Also, it permits the first and second slider members to be substantially reduced in size, to thereby stabilize the subassembly. Further, it permits the disc cartridge to be applied to both a double-direction sliding shutter structure and a single-direction sliding shutter structure while ensuring use of inherently inexpensive resin for the shutter 4. Moreover, it ensures smooth operation of the shutter 4, improved reliability in operation thereof and increased strength thereof. Furthermore, it ensures that the disc cartridge is manufactured with ease and at a reduced cost by means of a molding die.

Also, the illustrated or third embodiment may be constructed in such a manner that the connection 43 of the shutter 4 is provided at the intermediate portion thereof with the lug 44, which is formed in at least one of upper and lower surfaces thereof with the mounting holes 45. Correspondingly, the first slider member 6 is provided thereon with the elastically deformable projections 65, which are fitted in the respective mounting holes 45 of the lug 44. Thus, assembling of the disc cartridge may be carried out in a manner to incorporate a disc-like medium 10, erasure prevention members 13, the first and second slider members 6 and 7, and the coiled spring 8 in one of the upper and lower casing members 1 and 2, firmly join the upper and second casing members 1 and 2 to each other, and then mount the shutter 4 on the first slider member 6. This facilitates assembling between the spring 8 for restoring the shutter 4 to the closing position and the slider members 6 and 7 for guiding the shutter 4 without any shutter fixing means such as, for example, screws or the like.

In the assembling, engagement between the first slider member 6 and the second slider members 7 may be carried out by pressedly fitting the covering walls 72 arranged on both sides of the spring holder 71 of each second slider member 7 on a corresponding one of the opposite ends of the first slider member 6. Then, the second slider members 7 are respectively abutted against the stopper projections 23 and 24 arranged on the casing so as to be positioned along the opposite ends of the openings at the central portion of the casing.

The first slider member 6, as described above, is provided with the strip-like projection guides 64 slidably fitted in the first guide section or groove 9 of the casing and the reinforcements 61 fitted in the lug 44 of the shutter 4. This results in the portion of the shutter 4 against which the shutter operation member of the recording/reproducing apparatus is abutted being reinforced to a degree sufficient to increase durability of the shutter 4. Also, the second slider members 7 are each provided with the rails or strip-like projections 73 fitted in the first guide sections or grooves 9 and projections $73_1$ (FIGS. 15A to 16B) fitted in the second guide sections or grooves $9_1$ arranged in parallel to the guide grooves 9 in such a manner that both projections 73 and $73_1$ are juxtaposed to each other. Such construction permits sliding movement of the shutter 4 to be highly stabilized and ensures improved operation of the shutter.

The shutter 4 is formed with a substantially U-shape in section and constructed so as to slide along a front end of the casing while straddling the front end. Also, the shutter 4 is constructed so as to be slid by the first slider member 6, and the strip-like projection 64 of the first slider member 6 acting as the guide and the first and second guide sections 9 and $9_1$ cooperate with each other to permit the shutter 4 to be slidably moved between the closing portion and the opening position. Also, the second slider members 7 are arranged on the respective ends of the first slider member 6 and the coiled spring 8 is arranged so as to exhibit an elastic restoring force in a direction in which the second slider members 7 pull against each other.

Now, a mechanism of urging the shutter 4 in the closing direction will be described. When the shutter 4 is moved in a right-hand opening direction, the left-hand second slider member 7 is kept abutted against the stopper projection 24 of the casing positioned on a left-hand side of the head insertion holes 12 and 22 and the right-hand second slider member 7 is moved in a right-hand opening direction together with the first slider member 6. This causes the coiled spring 8 to be extended, resulting in generating an elastic restoring force which urges the shutter 4 toward the closing position.

Properties of resin used for the shutter 4 are utilized for providing the shutter 4 which is so constructed that the connection 43 is provided at the intermediate portion thereof with the lug 44 at which the shutter operation member of the recording/reproducing apparatus is abutted. The first slider member 6 arranged in the shutter 4, as described above, serves to guide sliding of the shutter 4. The first slider member 6 is provided with the reinforcements 61 for reinforcing the portions of the shutter 4 against which the shutter operation member is abutted. Such construction permits the shutter 4 to exhibit increased dimensional stability and be free from any deterioration in appearance such as surface sink or the like while being relatively reduced in thickness.

In the illustrated embodiment, the elastic member 8 is constituted by a coiled extension spring. The first slider member 6 is abutted at the reinforcements 61 thereof against the inner surface of the lug 44 provided on the connection 43 of the resin shutter 4.

Figure 16A:
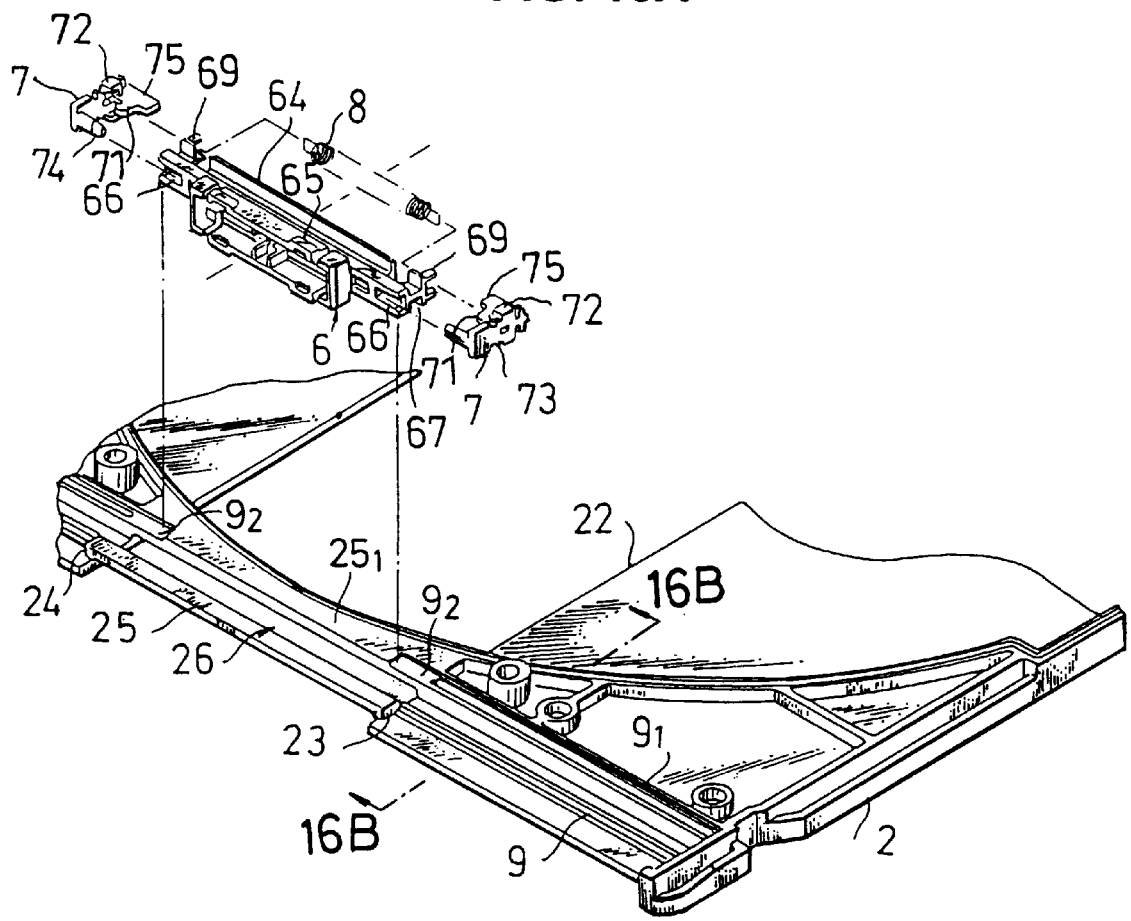
FIG. 16A is an fragmentary enlarged exploded perspective view showing a lower casing member and the slider in the disc cartridge shown in FIG. 11.
Figure 19:
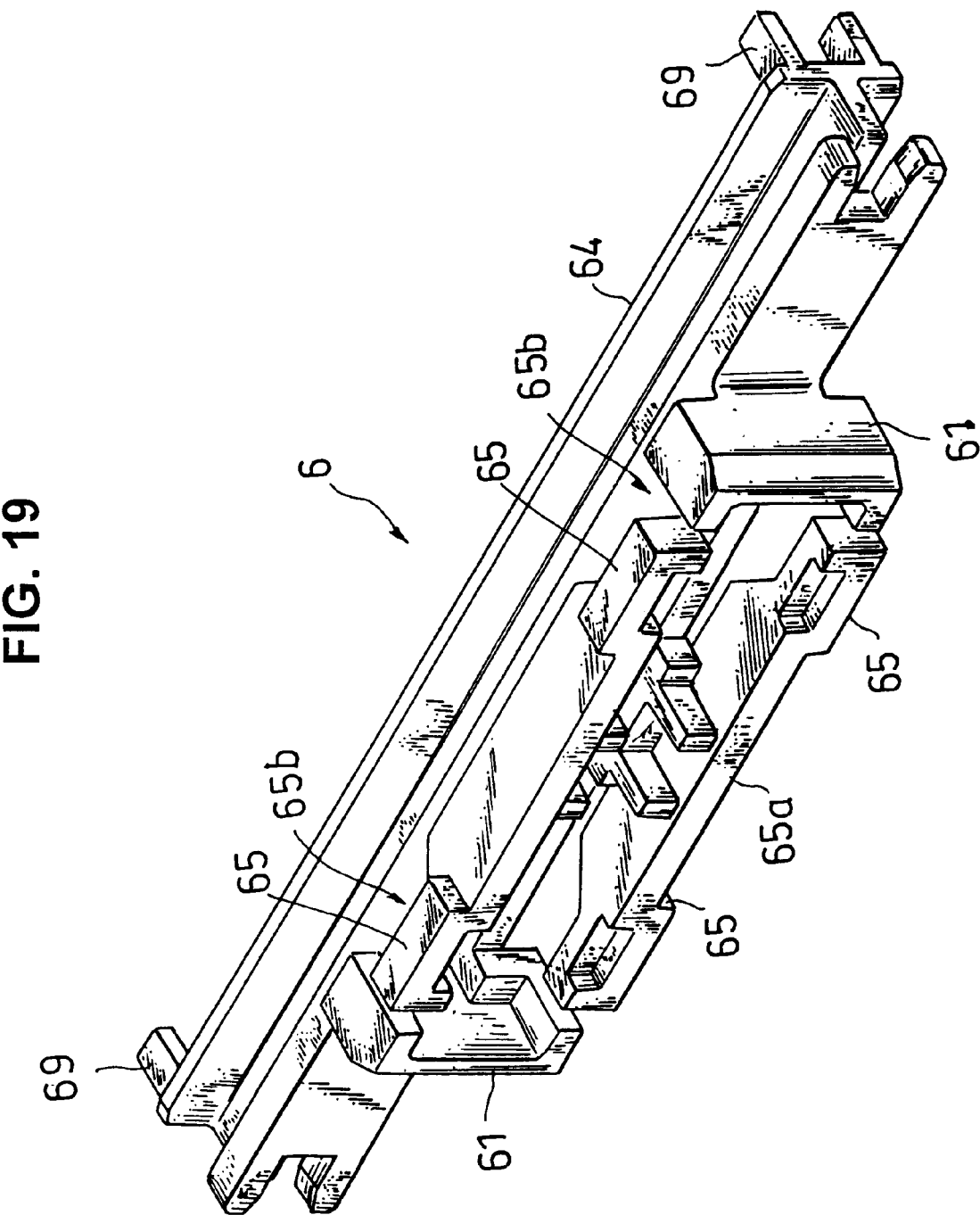
FIG. 19 is an enlarged perspective view showing a variation of the first slider member shown in FIG. 18C.
Figure 20:
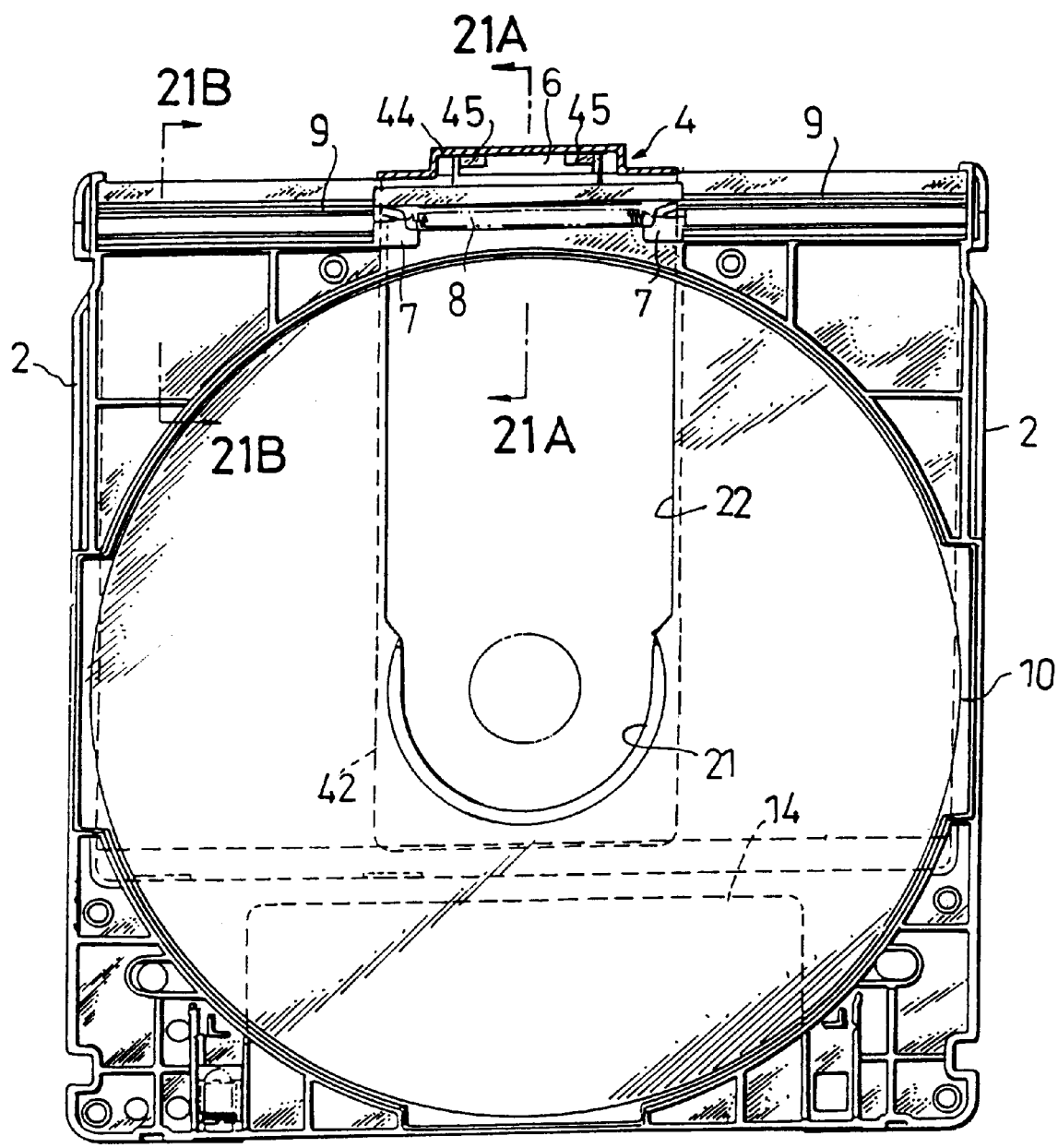
FIG. 20 is a plan view showing a modification of the disc cartridge shown in FIG. 11, from which an upper casing member is omitted for the sake of brevity.
Figure 21A:
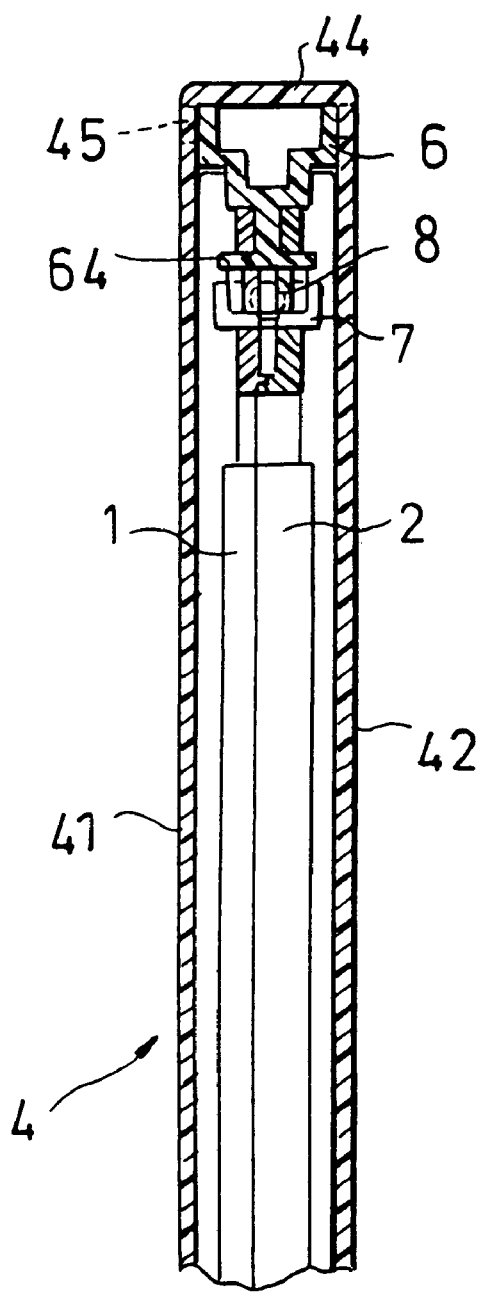
FIGS. 21A and 21B are an enlarged vertical sectional view taken along line 21A—21A of FIG. 20 and an enlarged vertical sectional view taken along line 21B—21B of FIG. 20, respectively.
Figure 21B:
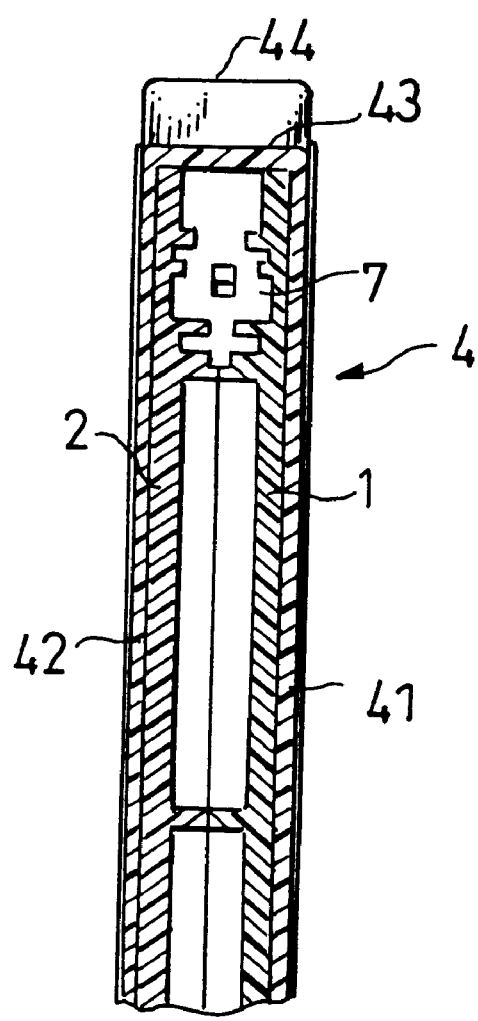
Figure 22:
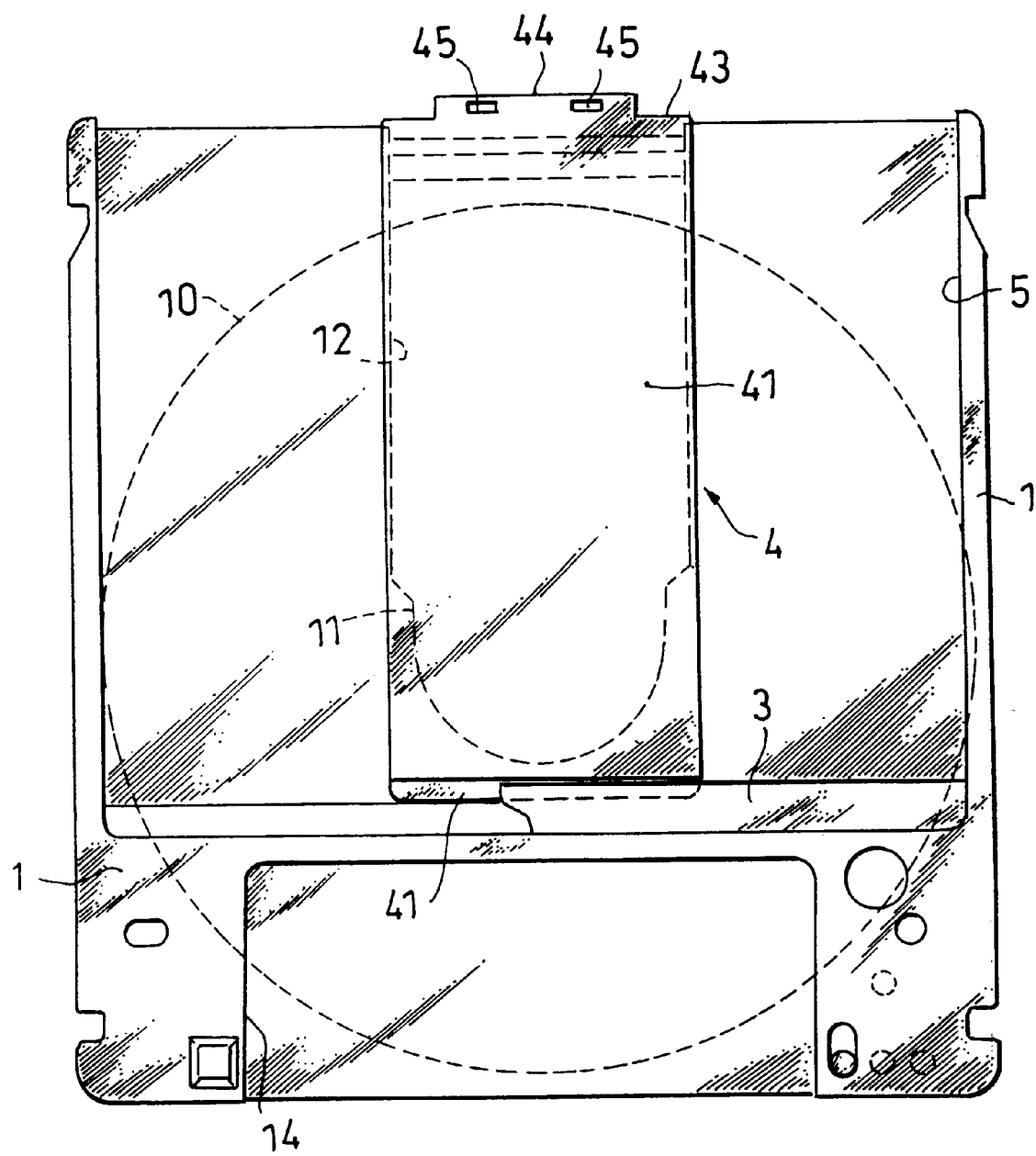
FIG. 22 is a plan view of the disc cartridge shown in FIG. 20 wherein a guide is partially cut away.

Referring now to FIGS. 17A to 22, a modification of the third embodiment described above is illustrated. A disc cartridge of the modification is constructed so as to prevent a shutter from being detached from a casing due to application of any external force or shock to the shutter or disc cartridge. More particularly, a first slider member 6 is provided thereon with elastically deformable projections 65 as shown in FIG. 16A and a shutter 4 is formed on an inner surface thereof with projections 46 in proximity to mounting holes 45 formed in upper and lower surfaces of a lug 44 as shown in FIGS. 17A to 18C. The projections 46 of the shutter 4 are each formed thereon with a slanting surface and act to hold a corresponding one of the projections 65 of the first slider member 6. Also, the first slider member 6 may be provided at a portion thereof positionally corresponding to the projections 46 of the shutter 4 with cutouts 65b as shown in FIG. 19. Such construction prevents the shutter 4 from being detached from the first slider member 7 and therefore the casing due to application of shock to the shutter 4 or casing.

Engagement between the projections 65 of the first slider member 6 and the projections 46 formed on the inner surface of the lug 44 of the shutter 4 so as to have a slanting surface more effectively prevents detaching of the shutter 4 from first slider member 7.

As described above, the modification is so constructed that the lug 44 of the connection 43 of the shutter 4 is formed in at least one of the upper and lower plates 41 and 42 with the mounting holes 45 and correspondingly the first slider member 6 is provided thereon with the elastically deformable projections 65 fitted in the respective mounting holes 45. Such construction permits the first slider member 6 fixed in the shutter 4 to effectively guide sliding movement of the shutter 4 between the opening position and the closing position. The spring 8 is held at opposite ends thereof on the spring holders 71 of the two second slider members 7, so that the first slider member 6 is pressedly interposed between the second slider members 7 by means of the spring 8. Thus, the first and second slider members 6 and 7 may be incorporated in one of the upper and lower casing members 1 and 2 while keeping the second slider members 7 engagedly held on the opposite ends of the first slider member 6. Then, the upper and lower casing members 1 and 2 are securely joined to each other, followed by fixing of the shutter 4 onto the first slider member 7. Thus, assembling of the disc cartridge is highly facilitated and improved. Also, the modification is effectively applied to both a double-direction sliding shutter structure and a single-direction sliding shutter structure.

Thus, it will be noted that the modification highly facilitates assembling of the disc cartridge and minimizes a failure in assembling thereof. Also, it permits the disc cartridge to be applied to both a double-direction sliding shutter structure and a singledirection sliding shutter structure while ensuring use of inherently inexpensive resin for the shutter. Further, it ensures smooth operation of the shutter, improved reliability in operation thereof and increased strength thereof. Moreover, it ensures that the disc cartridge is manufactured with ease and at a reduced cost by means of a molding die.

Also, the modification, as described above, is constructed so as to engage the elastically deformable projections 65 of the first slider member 6 with the projections 46 each having the slanting surface which are provided in the lug 44 of the shutter 4, resulting in effectively preventing detaching of the shutter 4 from the first slider member 6, to thereby improve safety of the shutter 4.

Figure 23:
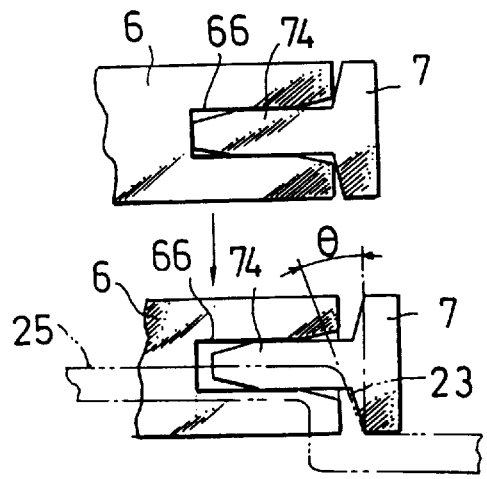
FIG. 23 is a fragmentary enlarged view showing incorporation of a slider into a casing.

The third embodiment described above may be further constructed in such a manner as shown in FIG. 23. More specifically, it may be so constructed that either each second slider member 7 or a portion of the each stopper projection 23 or 24 which is opposite to a corresponding one of the second slider members 7 and through which the second slider members 7 are incorporated into the casing is formed with an inclined guide surface which is inclined at a predetermined angle e with respect to a vertical plane, so that the first and second slider members 6 and 7 are assembled in the casing while keeping the second slider members 7 outwardly spaced from the respective opposite ends of the first slider member 6 through the inclined guide surface against an elastic force of the spring 8. Such construction permits the first and second slider members 6 and 7 to be kept integrally combined together irrespective of the fact that the first and second slider members are actually formed separately from each other, resulting in preventing production of resin powders and absorbing a dimensional error occurring during molding of the slider members. Further, it likewise ensures that incorporation of a subassembly of the first and second slider members 6 and 7 in the casing may be positively carried out without any backlash.

The second slider members 7 are each pressedly abutted against the inclined guide surface of a corresponding one of the stopper projections 23 and 24 arranged on the opposite ends of a connection section 25 of the casing provided at a front end positioned forwardly of head insertion holes 12 and 22 as shown in FIG. 23. Alternatively, the second slider members 7 may each be provided with an inclined surface.

Figure 16B:
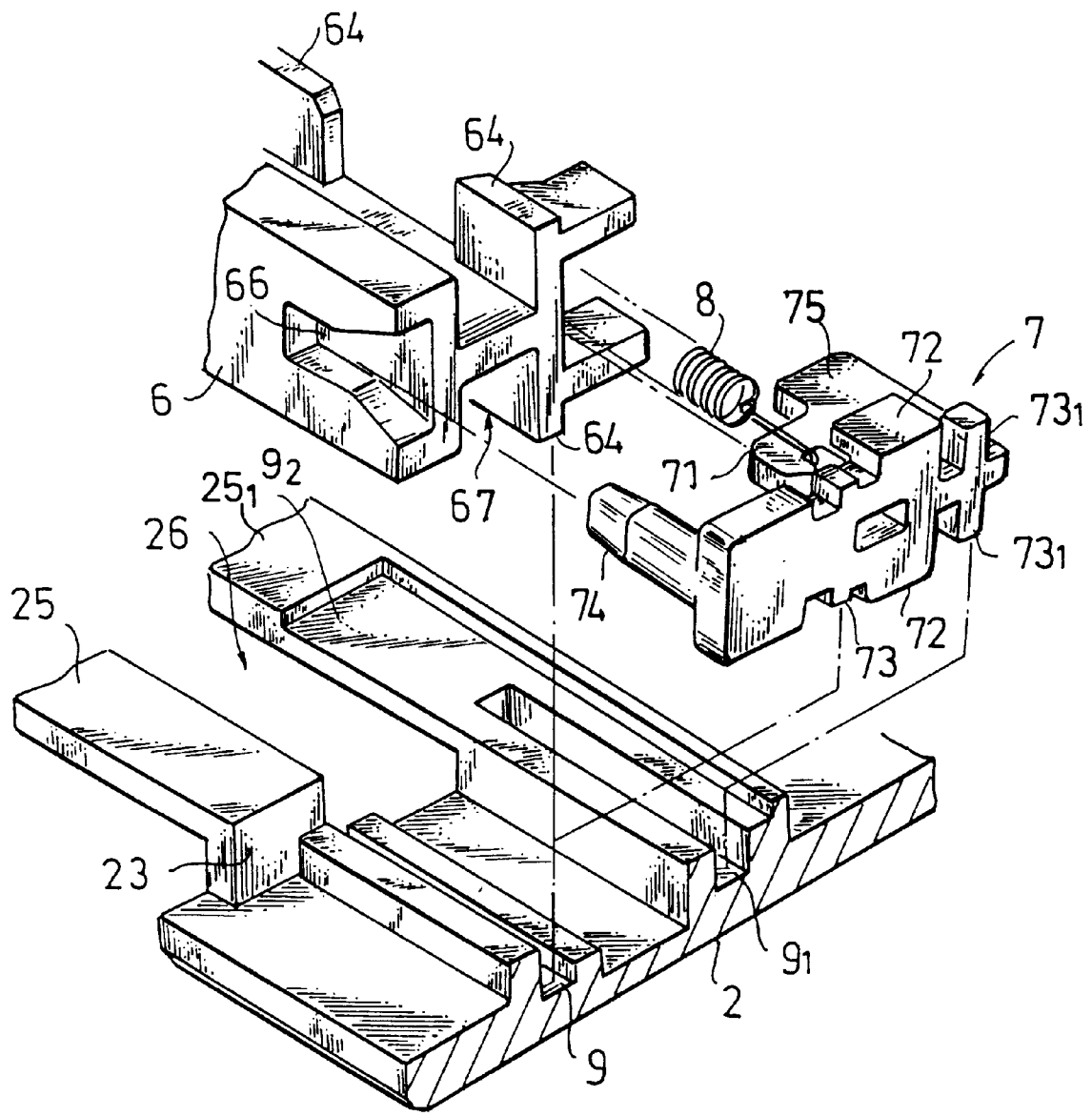
FIG. 16B is an exploded sectional view taken along line 16B—16B of FIG. 16A.

Also, the first slider member 6 may be slidably moved by arranging the spring 8 in a gap 26 (FIG. 16A) formed between the connection section 25 and an additional connection section $25_1$ arranged on the front end positioned forwardly of the head insertion holes 12 and 22 of the casing and fitting a guide recess 67 of the first slider member 6 (FIGS. 12 to 14B) on the connection section 25 as shown in FIGS. 16A and 16B.

Further, the second slider members 7, as shown in FIGS. 15A to 15D, may each be provided thereon with a guide projection 74, for example, such as a support bar or a rod-like member fitted in a rectangular hole formed by cooperation between each of recesses 66 formed in the first slider member 6 and the connection 43 of the shutter 4. Also, the second slider members 7 are each provided thereon with a plate-like guide 75 fitted in a recess or groove 92 formed on an inner surface of the casing. Such arrangement permits the first and second slider members 6 and 7 to slide integrally with each other.

The guide projection 74 and plate-like guide 75 are preferably provided on the second slider member 7 while being spaced from each other so as to be positioned on both sides of a mating portion between the first slider member 6 and the second slider member 7. This improves assembling between both slider members 6 and 7. Also, the guide projection 74 and recess 66 may be tapered to facilitate fitting of the projection 74 in the recess 66. The guide 75 is preferably arranged on the spring holder 71 of the second slider member 7. This is for the reason that the first slider member 6 is provided on each of the opposite ends thereof with the holding section 69 of a substantially U-shape in section which is formed therein with the gap as described above, therefore, fitting of the spring holder 71 of the second slider member 7 in the gap of the holding section 69 permits the second slider member 7 to be held on the stopper projection 23 or 24.

Thus, in the illustrated embodiment, the first slider member 6 is pressedly interposed between the second slider members 7 by means of the spring 8 and the second slider members 7 are moved together with the first slider member 6 while being firmly united to the first slider member 6. This ensures smooth sliding of the slider members 6 and 7 without any inclination and backlash. Also, the second slider members 7 are firmly arranged on the casing while being kept from being detached therefrom when they do not move. Further, the second slider members 7 may be incorporated in one of the upper and lower casing members 1 and 2 while being securely engaged with the respective opposite ends of the first slider member 6 against an elastic restoring force of the spring 8. In addition, each of the second slider members 7 or the portion of the casing which is opposite to the second slider member 7 and in which the second slider member is incorporated is formed with the inclined guide surface, so that the first and second slider members 6 and 7 may be incorporated in the casing while keeping the second slider members 7 outwardly spaced from the respective opposite ends of the first slider member 6 through the inclined guide surface against an elastic force of the spring 8. Such construction permits the first and second slider members 6 and 7 to be kept integrally combined together irrespective of the fact that the first and second slider members are actually formed separately from each other, resulting in preventing production of resin powders and absorbing a dimensional error occurring during molding of the slider members. Further, it ensures smooth fitting between the first slider member 6 and the second slider members 7, smooth movement of the shutter and increased durability of the shutter.

Figure 24:
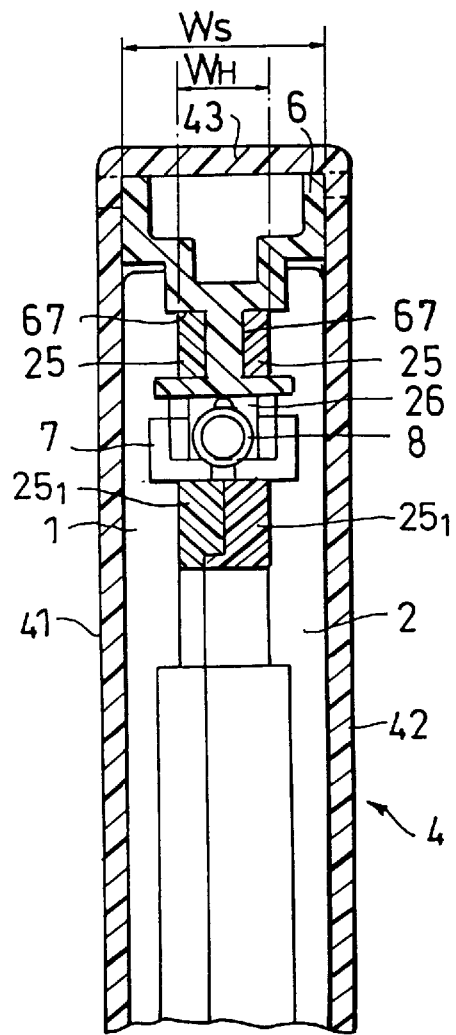
FIG. 24 is a fragmentary enlarged sectional view showing an essential part of the shutter having the slider incorporated therein in the disc cartridge shown in FIG. 11.

In addition, the third embodiment may be constructed that the connection of the casing positioned forwardly of the front end of the head insertion holes 12 and 22 is provided at a central portion thereof with the gap 26 to separate the connection into two connection sections 25 and 25, through the gap 26 as shown in FIGS. 16A, 16B and 24, so that the spring 8 is arranged in the gap 26. The guide recess 67 of the first slider member 6 is fitted on the connection section 25 of the casing, resulting in being slidably guided thereon. Such construction further facilitates incorporation of the subassembly of the slider members 6 and 7 and spring 8 in the casing and ensures more smooth movement of the slider members or shutter 4.

In the illustrated embodiment, the connection section 25, as shown in FIG. 16A, may be connected to one of a pair of rail-like guide members which form the first guide section 9, so that the holding sections 69 are fitted on the rail-like guide member. Also, the connection sections 25 and $25_1$ are formed with a width $W_H$ which is set to be smaller than a width $W_s$ of a slide portion of the casing on which the shutter 4 is slid. This permits a head or optical pickup for recording and/or reproducing data on the disc to pass therethrough. The spring 8 arranged in the gap between the connections 25 and $25_1$ is preferably formed with a width equal to or smaller than the width $W_H$.

As described above, the third embodiment may be constructed in the manner that the first slider member 6 is pressedly interposed between the second slider members 7 by means of the spring 8, the first slider member 6 is heldly fitted on the connection section 25 of the casing arranged forwardly of the head insertion holes 12 and 22, and the spring 8 is arranged in the gap between the connections 25 and $25_1$. Such construction facilitates incorporation of the subassembly of the slider members 6 and 7 and spring 8 in the casing and ensures more smooth movement of the slider members.

The above embodiments have been described with reference to a disc cartridge which has a double-sided recordable/reproducible disc received therein. However, the present invention is likewise effectively applicable to a disc cartridge including a single-sided recordable/reproducible disc as well.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:

a casing formed with openings through which a recording/reproducing head and a drive shaft are insertable into said casing, said casing including a surface for rotatably receiving a disc medium thereon;

a shutter for opening and closing said openings;

said shutter including an upper plate, a lower plate and a connection portion for connecting said upper plate to said lower plate, whereby said shutter is formed in a substantially U-shaped configuration;

a slider for sliding said shutter on said casing; and a spring for urging said shutter in a closing direction to close said openings;

said slider including a first slider member which slides while being engaged with a first guide section provided on said casing, said first slider member including a first end and a second end, and a pair of second slider members which slide while being engaged with a second guide section provided on said casing and are arranged on said first and second ends of said first slider member so as to interpose said first slider member therebetween while being pressed against said slider by means of said spring;

said connection portion being provided with a lug comprising an outwardly extending portion defining an outer surface and an inner space whereby a shutter operation member can abuttingly engage said outer surface of said lug, said lug including upper and lower surfaces corresponding to said upper and lower plates of said shutter, at least one of said upper and lower surfaces of said lug including mounting holes, and said first slider member including elastically deformable projections adapted to be fitted in said mounting holes of said lug.

2. A disc cartridge comprising:

a casing formed with openings through which a recording/reproducing head and a drive shaft are insertable into said casing said casing including a surface for rotatably receiving a disc medium, said casing including a first guide section and a pair of second guide sections on opposite sides of said first guide section;

a shutter for opening and closing said openings;

said shutter including an upper plate, a lower plate and a connection portion for connecting said upper plate to said lower plate whereby said shutter is formed in a substantially U-shaped configuration; said connection portion including a lug comprising an outwardly extending portion defining an outer surface and an inner space, whereby a shutter operation member can abuttingly engage said outer surface of said lug;

a slider for sliding said shutter on said casing said slider being fixedly mounted within said inner space of said lug; and an elastic member comprising a spring for urging said shutter in a closing direction to close said openings, said slider including a first slider member which slides while being engaged with said first guide section, said first slider member including a first end and a second end, a pair of second slider members which slide while being engaged with said second guide sections, said pair of second slider members being arranged at said first and second ends of said first slider member so as to interpose said first slider member therebetween while being pressed against said first slider member by means of said spring;

said lug including upper and lower lug surfaces corresponding to said upper and lower plates of said shutter, and mounting holes in at least one of said upper and lower lug surfaces; and said first slider member including elastically deformable projections for fitting in said mounting holes of said lug.

3. A disc cartridge as defined in claim 2, wherein said shutter is made of resin.

4. A disc cartridge as defined in claim 3, wherein said shutter includes a plurality of projections, each of said plurality of projections having a slanting surface and engaged with a corresponding one of said elastically deformable projections; and said plurality of projections of said shutter being arranged in proximity to said mounting holes of said lug.

5. A disc cartridge as defined in claim 4, wherein said first slider member includes cutouts provided at a portion thereof positionally corresponding to said projections of said shutter.

6. A disc cartridge as defined in claim 2 wherein said first slider member includes a strip-like projection for slidable engagement in said first guide section and reinforcements for said inner space of said lug.

7. A disc cartridge as defined in claim 6 wherein said first guide section and said pair of second guide sections are arranged in parallel; and each of said pair of second slider members includes a first strip projection for engagement with said first guide section and a second projection for engagement with said second guide section, said first and second projections being juxtaposed with each other.

8. A disc cartridge as defined in claim 6 wherein said shutter is made of resin.

9. A disc cartridge as defined in claim 2 wherein said first guide section and said pair of second guide sections are arranged in parallel, and said pair of second slider members includes a first slidable projection for slidable engagement with said first guide section and a second slidable projection for slidable engagement in said one of said pair of second guide sections, said first and second slidable projections being juxtaposed with each other.

10. A disc cartridge comprising:

a casing formed with openings through which a recording/reproducing head and a drive shaft are insertable into said casing said casing including a surface for rotatably receiving a disc medium, said casing including a first guide section, a pair of second guide sections on opposite sides of said first guide section, a front end, and a pair of stopper projections formed at a central portion of said front end of said casing positioned on opposite ends of said openings;

a shutter for opening and closing said openings;

said shutter including an upper plate, a lower plate and a connection portion for connecting said upper plate to said lower plate whereby said shutter is formed in a substantially U-shaped configuration; said connection portion including a lug comprising an outwardly extending portion defining an outer surface and an inner space, whereby a shutter operation member can abuttingly engage said outer surface of said lug;

a slider for sliding said shutter on said casing said slider being fixedly mounted within said inner space of said lug; and an elastic member comprising a spring for urging said shutter in a closing direction to close said openings, said slider including a first slider member which slides while being engaged with said first guide section, said first slider member including a first end and a second end, and a pair of second slider members which slide while being engaged with said second guide section, said second slider members being arranged on said first and second ends of said first slider member so as to interpose said first slider member therebetween while being pressed against said first slider member by means of said spring; and said pair of second slider members being respectively disengagingly abutted against said pair of upper projections.

11. A disc cartridge as defined in claim 10 wherein said first and second slider members are vertically symmetrical.

12. A disc cartridge as defined in claim 11 wherein said casing comprises a first casing member and a second casing member; and said first slider member and said pair of second slider members are incorporated in one of said first and second casing members, said first and second casing members are joined to each other, and said shutter is connected to said first slider member.

13. A disc cartridge as defined in claim 11 wherein said first slider member is fittingly mounted within said inner space of said lug.

14. A disc cartridge as defined in claim 11 wherein said first guide section comprises a rail configuration and said stopper projections are formed on opposite ends of said first guide section and include positioning surfaces for determining a closing position of said shutter.

15. A disc cartridge as defined in claim 10 wherein said casing comprises a first casing member and a second casing member; and wherein said first and second slider members are incorporated in one of said first and second casing members and said first and second casing members are joined to each other and said shutter is connected to said first slider member.

16. A disc cartridge as defined in claim 10 wherein said first slider member is fixedly mounted within said inner space of said lug.

17. A disc cartridge as defined in claim 10 wherein said first guide section comprises a rail-like configuration;

said stopper projections being formed on opposite ends of said first guide section and including a positioning surface for determining a closing position of said shutter.

18. A disc cartridge comprising:

a casing formed with openings through which a recording/reproducing head and a drive shaft are insertable into said casing said casing including a surface for rotatably receiving a disc medium, said casing including a first guide section and a pair of second guide sections on opposite sides of said first guide section;

a shutter for opening and closing said openings;

said shutter including an upper plate, a lower plate and a connection portion for connecting said upper plate to said lower plate whereby said shutter is formed in a substantially U-shaped configuration; said connection portion including a lug comprising an outwardly extending portion defining an outer surface and an inner space, whereby a shutter operation member can abuttingly engage said outer surface of said lug;

a slider for sliding said shutter on said casing said slider being fixedly mounted within said inner space of said lug; and an elastic member comprising a spring for urging said shutter in a closing direction to close said openings, said slider including a first slider member which slides while being engaged with said first guide section, said first slider member including a first end and a second end, and a pair of second slider members which slide while being engaged with said pair of second guide sections, said pair of second slider members being arranged at said first and second ends of said first slider member so as to interpose said first slider member therebetween while being pressed against said first slider member by means of said spring;

each of said pair of second slider members being provided with a spring holder and covering walls positioned on either side of said spring holder, and said first and second ends of said first slider member being fittingly engageable with said covering walls of said corresponding pair of second slider members.

19. A disc cartridge as defined in claim 18 wherein said first and second ends of said first slider member include a U-shaped holding section providing a gap through which said spring is insertable.

20. A disc cartridge as defined in claim 19 wherein said spring comprises a coiled extension spring having a center substantially aligned with said covering walls of said pair of second slider members.

21. A disc cartridge as defined in claim 18 wherein said spring comprises a coiled extension spring having a center substantially aligned with said covering walls of said pair of second slider members.

22. A disc cartridge comprising:

a casing formed with openings through which a recording/reproducing head and a drive shaft are insertable into said casing said casing including a surface for rotatably receiving a disc medium, said casing including a first guide section and a pair of second guide sections on opposite sides of said first guide section;

a shutter for opening and closing said openings;

said shutter including an upper plate, a lower plate and a connection portion for connecting said upper plate to said lower plate whereby said shutter is formed in a substantially U-shaped configuration; said connection portion including a lug comprising an outwardly extending portion defining an outer surface and an inner space, whereby a shutter operation member can abuttingly engage said outer surface of said lug;

a slider for sliding said shutter on said casing said slider being fixedly mounted within said inner space of said lug; and an elastic member comprising a spring for urging said shutter in a closing direction to close said openings, said slider including a first slider member which slides while being engaged with said first guide section, said first slider member including a first end and a second end, and a pair of second slider members which slide while being engaged with said second guide sections, said pair of second slider members being arranged on said first and second ends of said first slider member so as to interpose said first slider member therebetween while being pressed against said first slider member by means of said spring;

said first slider member including at least one first recess, said casing including at least one second recess, and said pair of second slider members including at least one guide projection for fitting engagement with said first recess, and at least one guide member for fitting engagement with said at least one second recess.

23. A disc cartridge as defined in claim 22 wherein said at least one guide projection and said at least one guide member of said pair of second slider members are spaced from each other at positions on both sides of said portion of said first and second ends of said first slider member and each of said pair of second slider members which can be pressed against each other.

24. A disc cartridge as defined in claim 23 wherein each of said pair of second slider members includes a spring holder, and said plate guide member is disposed on said spring holder.

25. A disc cartridge as defined in claim 23 wherein each of said first and second ends of said first slider member includes a substantially U-shaped holding section providing a gap therein to which said spring is insertable; and said spring holder of each of said pair of second slider members is disposed to be engaged in said gap of one of said substantially U-shaped holding sections.

26. A disc cartridge as defined in claim 22 wherein each of said pair of second slider members includes a spring holder, and wherein said at least one plate-like guide member is disposed on said spring holder .

27. A disc cartridge as defined in claim 26 wherein each of said first and second ends of said first slide member includes a substantially U-shaped holding section providing a gap through which said spring is insertable; and said spring holder of each of said pair of second slider members is disposed to be engaged in said gap of said substantially U-shaped holding sections.

28. A disc cartridge comprising:

a casing formed with openings through which a recording/reproducing head and a drive shaft are insertable into said casing said casing including a surface for rotatably receiving a disc medium, said casing including a first guid section and a pair of second guide sections on opposite sides of said first guide section, and a connection section at a central portion forward of said openings in said casing;

a shutter for opening and closing said openings;

said shutter including an upper plate, a lower plate and a connection portion for connecting said upper plate to said lower plate whereby said shutter is formed in a substantially U-shaped configuration; said connection portion including a lug comprising an outwardly extending portion defining an outer surface and an inner space, whereby a shutter operation member can abuttingly engage said outer surface of said lug;

a slider for sliding said shutter on said casing said slider being fixedly mounted within said inner space of said lug; and an elastic member comprising a spring for urging said shutter in a closing direction to close said openings, said slider including a first slider member which slides while being engaged with said first guide section, said first slider member including a first end and a second end, and a pair of second slider members which slidably engage with said second guide section, said pair of second slider members being arranged on said first and second ends of said first slider member so as to interpose said first slider member therebetween while being pressed against said first slider member by means of said spring;

said connection section including a gap in which said spring is disposed, and said first slider member including a guide recess fitted on said connection section whereby said first slider member is slidable on said connection section.

29. A disc cartridge as defined in claim 28 wherein said first guide section comprises a pair of rail members; and said second guide section is connected to one of said pair of rail members whereby said guide recess is fitted on said one of said rail-like members for slidable guiding of said first slide member therealong.

30. A disc cartridge as defined in claim 29 wherein each of said first and second ends of said first slider member includes a substantially U-shaped holding section forming a gap in which said spring is insertable.

* * * * *

UNITED STATES PATENT AND TRADEMARK OFFICE
CERTIFICATE OF CORRECTION

PATENT NO. : 6,094,326
DATED : July 25, 2000
INVENTOR(S) : Ikebe et al.

It is certified that error appears in the above-identified patent and that said Letters Patent is hereby corrected as shown below:

Col. 1, line 30, "slidetype" should read --slide-type--.

Col. 10, line 37, "$H_e$" should read --$H_B$--.

Col. 17, line 46, "singledirection" should read --single direction--.

Col. 18, line 1, "e" should read --$\theta$--.

Col. 18, line 39, "92" should read --$9_2$--.

Signed and Sealed this

Twenty-fourth Day of April, 2001

Attest:

NICHOLAS P. GODICI

*Attesting Officer*    *Acting Director of the United States Patent and Trademark Office*